United States Patent
Sasaki et al.

(10) Patent No.: US 8,385,019 B1
(45) Date of Patent: Feb. 26, 2013

(54) MAGNETIC HEAD FOR PERPENDICULAR MAGNETIC RECORDING INCLUDING A COIL ELEMENT LOCATED BETWEEN THE TOP SURFACE OF A MAIN POLE AND AN INCLINED SURFACE OF A SHIELD

(75) Inventors: Yoshitaka Sasaki, Santa Clara, CA (US); Hiroyuki Ito, Milpitas, CA (US); Kazuki Sato, Milpitas, CA (US); Shigeki Tanemura, Milpitas, CA (US); Hironori Araki, Milpitas, CA (US); Tatsuya Shimizu, Hong Kong (CN)

(73) Assignees: Headway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 0 days.

(21) Appl. No.: 13/472,981

(22) Filed: May 16, 2012

(51) Int. Cl.
*G11B 5/127* (2006.01)

(52) U.S. Cl. .................. 360/123.03; 360/125.03

(58) Field of Classification Search ............. 360/123.02, 360/123.03, 123.06, 123.1, 125.02, 125.03, 360/125.3
See application file for complete search history.

(56) References Cited

U.S. PATENT DOCUMENTS

| | | | | |
|---|---|---|---|---|
| 7,215,502 | B2 * | 5/2007 | Tagami | 360/77.08 |
| 7,219,414 | B2 * | 5/2007 | Watabe et al. | 29/603.13 |
| 7,612,963 | B2 * | 11/2009 | Allen et al. | 360/123.06 |
| 7,755,864 | B2 * | 7/2010 | Kato et al. | 360/234.5 |
| 7,924,528 | B2 * | 4/2011 | Sasaki et al. | 360/125.15 |
| 8,035,922 | B2 * | 10/2011 | Lille et al. | 360/123.06 |
| 8,201,320 | B2 * | 6/2012 | Allen et al. | 29/603.16 |
| 8,233,235 | B2 * | 7/2012 | Chen et al. | 360/125.15 |
| 8,274,759 | B1 * | 9/2012 | Sasaki et al. | 360/125.13 |
| 8,295,008 | B1 * | 10/2012 | Sasaki et al. | 360/125.02 |
| 2004/0150910 | A1 | 8/2004 | Okada et al. | |
| 2008/0151424 | A1 * | 6/2008 | Bedell et al. | 360/123.19 |
| 2009/0059426 | A1 | 3/2009 | Sasaki et al. | |

* cited by examiner

*Primary Examiner* — Brian Miller
(74) *Attorney, Agent, or Firm* — Oliff & Berridge, PLC

(57) ABSTRACT

A magnetic head includes a coil, a main pole, a write shield, a gap part, and a return path section. The return path section is located on the front side in the direction of travel of a recording medium relative to the main pole, and connects the write shield and part of the main pole away from a medium facing surface to each other. The coil includes a specific coil element. The main pole has a top surface including an inclined portion and a flat portion. The write shield has an inclined surface. The inclined surface includes a first portion opposed to the inclined portion with the gap part therebetween, and a second portion located farther from the medium facing surface than the first portion. The specific coil element includes a portion interposed between the flat portion and the second portion.

7 Claims, 14 Drawing Sheets

MAGNETIC HEAD FOR PERPENDICULAR MAGNETIC RECORDING INCLUDING A COIL ELEMENT LOCATED BETWEEN THE TOP SURFACE OF A MAIN POLE AND AN INCLINED SURFACE OF A SHIELD

BACKGROUND OF THE INVENTION

1. Field of the Invention

The present invention relates to a magnetic head for perpendicular magnetic recording that is used for writing data on a recording medium by means of a perpendicular magnetic recording system, and more specifically, to a magnetic head for perpendicular magnetic recording that has a main pole and a shield.

2. Description of Related Art

The recording systems of magnetic read/write apparatuses include a longitudinal magnetic recording system wherein signals are magnetized in a direction along the plane of the recording medium (the longitudinal direction) and a perpendicular magnetic recording system wherein signals are magnetized in a direction perpendicular to the plane of the recording medium. It is known that the perpendicular magnetic recording system is harder to be affected by thermal fluctuation of the recording medium and capable of providing higher linear recording density, compared with the longitudinal magnetic recording system.

Magnetic heads for perpendicular magnetic recording typically have, like those for longitudinal magnetic recording, a structure where a read head having a magnetoresistive element (hereinafter, also referred to as MR element) for reading and a write head having an induction-type electromagnetic transducer for writing are stacked on a substrate. The write head includes a main pole that produces a magnetic field in a direction perpendicular to the plane of the recording medium. The main pole includes, for example, a track width defining portion having an end located in a medium facing surface that faces the recording medium, and a wide portion that is connected to the other end of the track width defining portion and is greater in width than the track width defining portion. The track width defining portion has a generally constant width. To achieve higher recording density, it is required that the write head of the perpendicular magnetic recording system be smaller in track width and improved in write characteristics such as overwrite property which is a parameter indicating an overwriting capability.

A magnetic head for use in a magnetic disk drive such as a hard disk drive is typically provided in a slider. The slider has the medium facing surface mentioned above. The medium facing surface has an air inflow end (a leading end) and an air outflow end (a trailing end). The slider is designed to slightly fly over the surface of the recording medium by means of an airflow that comes from the air inflow end into the space between the medium facing surface and the recording medium. The magnetic head is typically disposed near the air outflow end of the medium facing surface of the slider. In a magnetic disk drive, positioning of the magnetic head is performed by a rotary actuator, for example. In this case, the magnetic head moves over the recording medium along a circular orbit about the center of rotation of the rotary actuator. In such a magnetic disk drive, a tilt of the magnetic head with respect to the tangent of the circular track, which is called a skew, occurs according to the position of the magnetic head across the tracks.

In particular, in a magnetic disk drive of the perpendicular magnetic recording system which is higher in capability of writing on a recording medium than the longitudinal magnetic recording system, the skew mentioned above can cause the phenomenon that signals already written on one or more tracks that are adjacent to a track targeted for writing are erased or attenuated during writing of a signal on the track targeted for writing (such a phenomenon will hereinafter be referred to as adjacent track erasure). For higher recording densities, it is necessary to prevent adjacent track erasure.

A known technique for preventing adjacent track erasure induced by a skew is to configure the main pole so that its end face located in the medium facing surface decreases in width with increasing proximity to the top surface of the substrate, as disclosed in U.S. Patent Application Publication Nos. US 2004/0150910 A1 and US 2009/0059426 A1, for example. U.S. Patent Application Publication Nos. US 2004/0150910 A1 and US 2009/0059426 A1 also disclose configuring the main pole so that its thickness in the vicinity of the medium facing surface decreases with increasing proximity to the medium facing surface.

In order to prevent skew-induced problems, it is also effective to reduce the thickness of the main pole in the medium facing surface. If the entire main pole is thinned, however, the main pole becomes small in cross-sectional area perpendicular to the direction in which magnetic flux flows. This makes it difficult for the main pole to direct much magnetic flux to the medium facing surface, thus leading to degradation of overwrite property.

Configuring the main pole so that its thickness in the vicinity of the medium facing surface decreases with increasing proximity to the medium facing surface as disclosed in U.S. Patent Application Publication Nos. US 2004/0150910 A1 and US 2009/0059426 A1 allows the main pole to be small in thickness in the medium facing surface and allows part of the main pole away from the medium facing surface to be large in thickness, thereby making it possible for the main pole to direct much magnetic flux to the medium facing surface.

In order to prevent adjacent track erasure induced by a skew and provide higher recording densities, it is effective to provide a write shield having an end face that is located in the medium facing surface at a position on the front side in the direction of travel of the recording medium relative to the end face of the main pole, as disclosed in U.S. Patent Application Publication No. US 2009/0059426 A1.

A magnetic head having the write shield is typically provided with a return path section for connecting the write shield to part of the main pole away from the medium facing surface. The write shield, the return path section, and the main pole define a space through which part of a coil passes. The write shield and the return path section have the function of capturing a magnetic flux that is produced from the end face of the main pole and spreads in directions other than the direction perpendicular to the plane of the recording medium, so as to prevent the magnetic flux from reaching the recording medium. The write shield and the return path section also have the function of allowing a magnetic flux that has been produced from the end face of the main pole and has magnetized the recording medium to flow back to the main pole.

The position of an end of a record bit to be recorded on the recording medium depends on the position of an end of the end face of the main pole located in the medium facing surface, the end being located on the front side in the direction of travel of the recording medium. In order to define the position of the end of the record bit accurately, it is therefore important that the write shield have an end face that is located in the medium facing surface at a position on the front side in the direction of travel of the recording medium relative to the end face of the main pole and that this end face of the write shield capture a magnetic flux that is produced from the end face of the main pole and spreads in directions other than the direction perpendicular to the plane of the recording medium. The magnetic head having the write shield is capable of preventing adjacent track erasure and provides a further improved recording density.

In view of the foregoing, in order to prevent adjacent track erasure induced by a skew and provide a higher recording density, the magnetic head can conceivably be configured so that part of the top surface of the main pole in the vicinity of the medium facing surface is formed into an inclined portion that is inclined relative to a direction perpendicular to the medium facing surface, and the write shield is provided with an inclined surface opposed to the inclined portion of the main pole, as disclosed in U.S. Patent Application Publication No. US 2009/0059426 A1.

The above-described configuration, however, has a problem in that where the inclined portion of the top surface of the main pole and the inclined surface of the write shield are opposed to each other over a large area with a small spacing therebetween, magnetic flux leakage from the main pole to the write shield increases to cause degradation of write characteristics such as the overwrite property.

To avoid this, as disclosed in U.S. Patent Application Publication No. US 2009/0059426 A1, the inclined portion may be made smaller than the inclined surface in length in the direction perpendicular to the medium facing surface. In this configuration, the inclined surface includes a first portion opposed to the inclined portion, and a second portion that is contiguous with the first portion and is located farther from the medium facing surface than is the first portion. The distance between the second portion and part of the top surface of the main pole that is located farther from the medium facing surface than is the inclined portion is greater than the distance between the first portion and the inclined portion of the top surface of the main pole. This makes it possible to prevent magnetic flux leakage from the main pole to the write shield.

As the frequency of a write signal is increased to achieve a higher recording density, the magnetic head is required to provide an improved rate of change in the direction of the magnetic flux produced from the end face of the main pole. To satisfy this requirement, it is effective to reduce the length of a magnetic path that passes through the write shield, the return path section and the main pole. However, the following problem will occur with the aforementioned configuration in which the inclined portion is smaller than the inclined surface in length in the direction perpendicular to the medium facing surface. In this configuration, due to the large distance between the second portion of the inclined surface and the part of the top surface of the main pole that is located farther from the medium facing surface than is the inclined portion, the space defined by the write shield, the return path section and the main pole, through which part of the coil passes, is also large. Thus, it is not possible to sufficiently reduce the length of the magnetic path that passes through the write shield, the return path section and the main pole.

OBJECT AND SUMMARY OF THE INVENTION

It is an object of the present invention to provide a magnetic head for perpendicular magnetic recording that makes it possible to avoid the problems induced by a skew and is capable of providing improved write characteristics and a shorter magnetic path passing through a write shield, a return path section, and a main pole.

A magnetic head for perpendicular magnetic recording of the present invention includes: a medium facing surface that faces a recording medium; a coil; a main pole; a write shield; a gap part; and a first return path section. The coil produces a magnetic field corresponding to data to be written on the recording medium. The main pole has an end face located in the medium facing surface. The main pole allows a magnetic flux corresponding to the magnetic field produced by the coil to pass, and produces a write magnetic field for writing the data on the recording medium by means of a perpendicular magnetic recording system. The write shield is made of a magnetic material and has an end face located in the medium facing surface. The gap part is made of a nonmagnetic material and interposed between the main pole and the write shield. The first return path section is made of a magnetic material and located on the front side in the direction of travel of the recording medium relative to the main pole.

The end face of the write shield includes a first end face portion located on the front side in the direction of travel of the recording medium relative to the end face of the main pole. The first return path section connects the write shield and part of the main pole away from the medium facing surface to each other so that a first space is defined by the main pole, the gap part, the write shield, and the first return path section. The coil includes at least one first coil element extending to pass through the first space.

The main pole has a top surface located at an end on the front side in the direction of travel of the recording medium. The top surface of the main pole includes an inclined portion and a flat portion arranged in this order, the inclined portion being closer to the medium facing surface than the flat portion. The inclined portion has a first end located in the medium facing surface and a second end opposite to the first end. Assuming a virtual plane that passes through the first end of the inclined portion and is perpendicular to the medium facing surface and to the direction of travel of the recording medium, the inclined portion is inclined relative to the virtual plane and the medium facing surface such that the second end is located on the front side in the direction of travel of the recording medium relative to the virtual plane. The flat portion extends in a direction substantially perpendicular to the medium facing surface.

The write shield has an inclined surface facing toward the top surface of the main pole. The inclined surface has a third end located in the medium facing surface and a fourth end opposite to the third end. The inclined surface is inclined relative to the virtual plane and the medium facing surface such that the fourth end is located farther from the virtual plane than is the third end. The inclined portion is smaller than the inclined surface in length in a direction perpendicular to the medium facing surface.

The inclined surface includes: a first portion that is opposed to the inclined portion with the gap part interposed therebetween; and a second portion that is contiguous with the first portion and is located farther from the medium facing surface than is the first portion. The at least one first coil element includes one specific coil element. The specific coil element includes a portion that is located closer to the medium facing surface than is the fourth end and interposed between the flat portion and the second portion.

In the magnetic head for perpendicular magnetic recording of the present invention, the minimum distance between the specific coil element and the medium facing surface may fall within the range of 0.1 to 0.15 µm.

In the magnetic head for perpendicular magnetic recording of the present invention, the first return path section may include a columnar portion disposed such that the specific coil element is interposed between the columnar portion and the inclined surface. In this case, the minimum distance between the columnar portion and the medium facing surface may fall within the range of 0.7 to 1.2 μm.

In the magnetic head for perpendicular magnetic recording of the present invention, the specific coil element and the flat portion of the top surface of the main pole may be at a distance of 5 to 100 nm from each other.

The magnetic head for perpendicular magnetic recording of the present invention may further include an insulating layer disposed between the specific coil element and the flat portion of the top surface of the main pole. In this case, each of the specific coil element and the insulating layer may have an end face facing toward the inclined surface. The inclined portion, the end face of the insulating layer, and the end face of the specific coil element may be located in one plane.

In the magnetic head for perpendicular magnetic recording of the present invention, the end face of the write shield may include a second end face portion located on the rear side in the direction of travel of the recording medium relative to the end face of the main pole. In this case, the magnetic head may further include a second return path section made of a magnetic material and located on the rear side in the direction of travel of the recording medium relative to the main pole. The second return path section may connect the write shield and part of the main pole away from the medium facing surface to each other so that a second space is defined by the main pole, the gap part, the write shield, and the second return path section. The coil may include at least one second coil element extending to pass through the second space.

In the magnetic head for perpendicular magnetic recording of the present invention, the end face of the write shield may further include a third end face portion and a fourth end face portion. In this case, the third end face portion and the fourth end face portion may be located on opposite sides of the end face of the main pole in the track width direction.

In the magnetic head for perpendicular magnetic recording of the present invention, the top surface of the main pole includes the inclined portion. This allows the main pole to be small in thickness in the medium facing surface and allows a portion of the main pole that is located farther from the medium facing surface than is the inclined portion to be large in thickness. Furthermore, in the present invention, the inclined portion is smaller than the inclined surface of the write shield in length in the direction perpendicular to the medium facing surface. This allows the inclined portion and the inclined surface to be opposed to each other over a smaller area, thereby making it possible to prevent magnetic flux leakage from the main pole to the write shield. Consequently, according to the present invention, it is possible to prevent the problems induced by a skew and to provide improved write characteristics.

Furthermore, in the present invention, the specific coil element of the coil includes a portion that is located closer to the medium facing surface than is the fourth end of the inclined surface and interposed between the flat portion of the top surface of the main pole and the second portion of the inclined surface. This allows coil elements to be disposed in the first space with a high space utilization efficiency. According to the present invention, it is thus possible to reduce the length of the magnetic path that passes through the write shield, the first return path section and the main pole.

Other objects, features and advantages of the present invention will become fully apparent from the following description.

DETAILED DESCRIPTION OF THE PREFERRED EMBODIMENTS

First Embodiment

Figure 1:
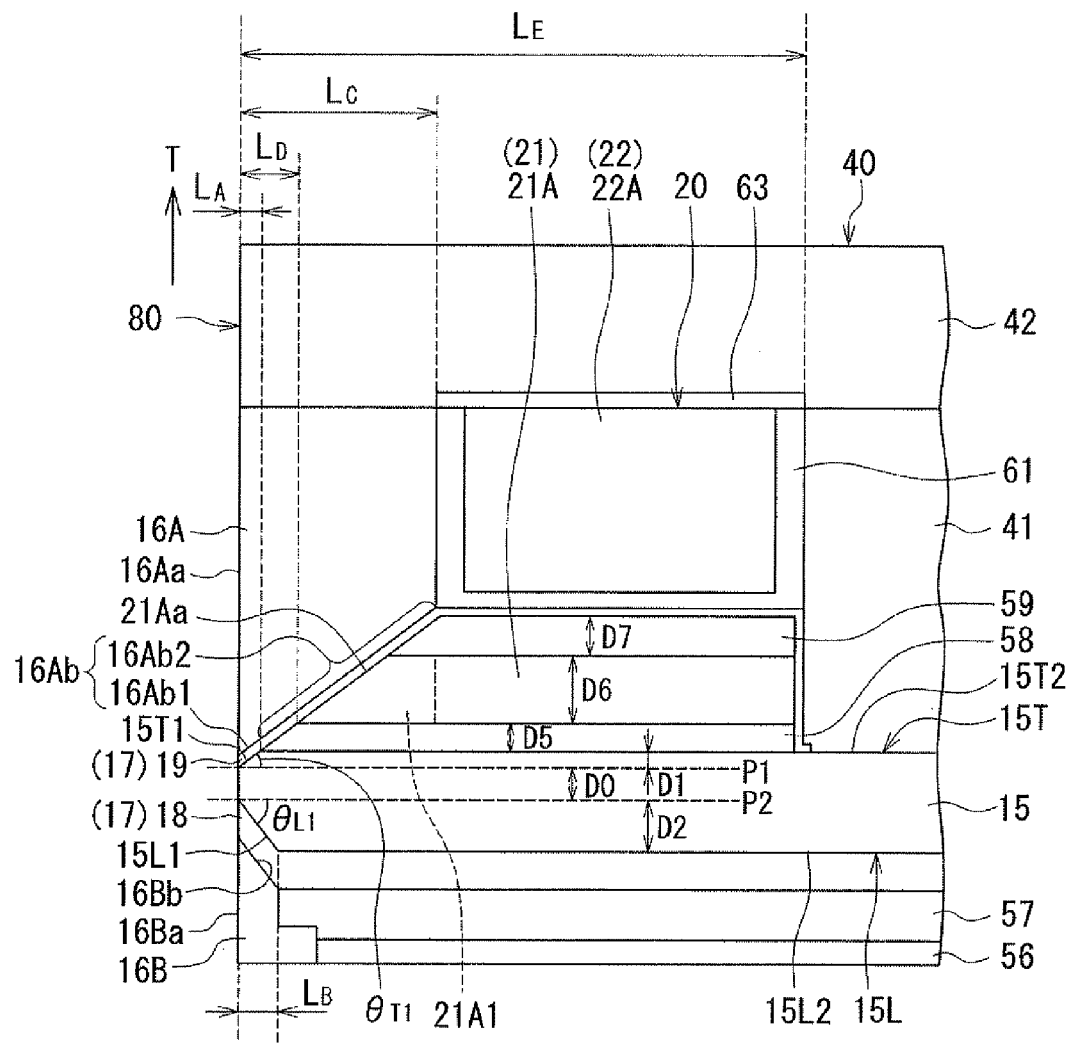
FIG. 1 is a cross-sectional view showing the main part of a magnetic head according to a first embodiment of the invention.
Figure 2:
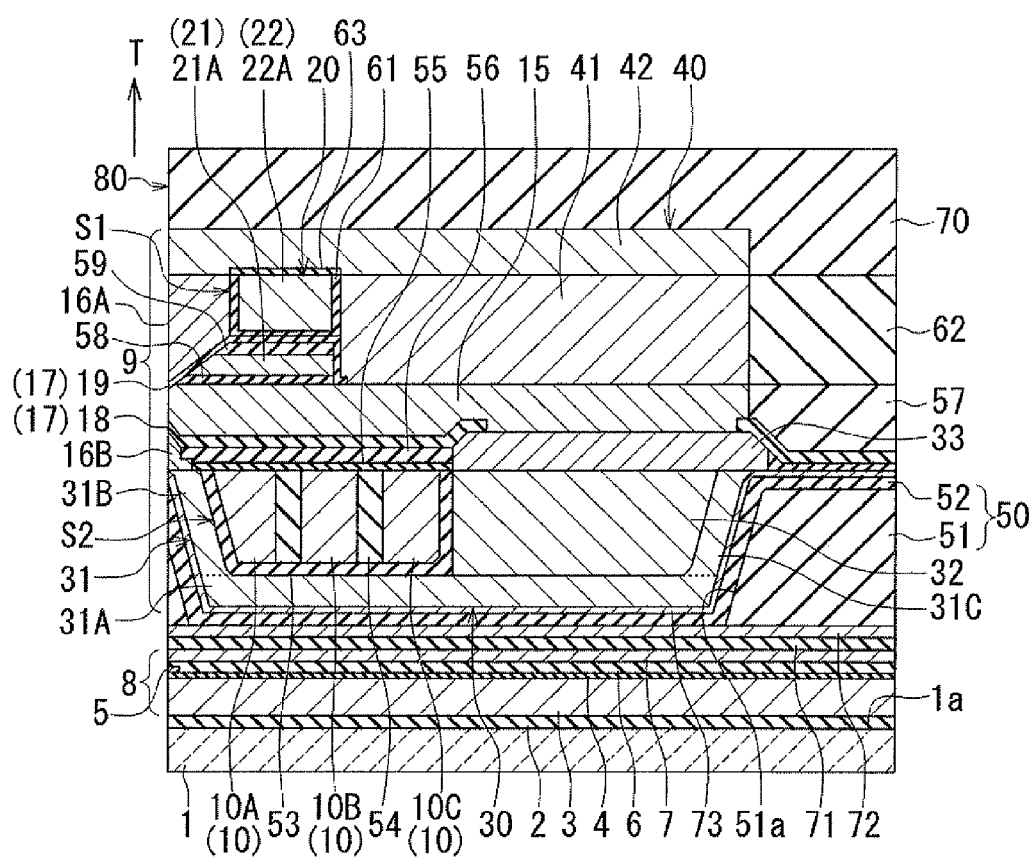
FIG. 2 is a cross-sectional view of the magnetic head according to the first embodiment of the invention.
Figure 3:
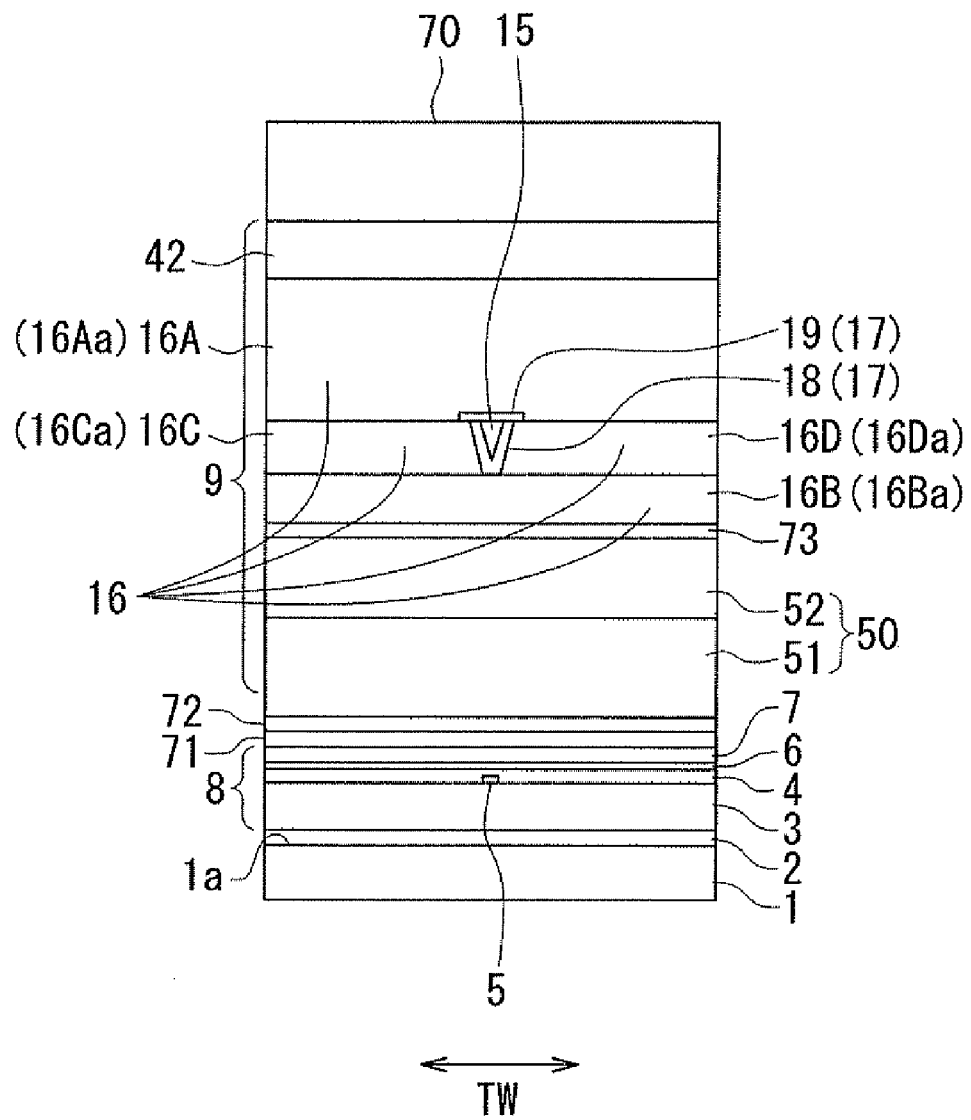
FIG. 3 is a front view showing the medium facing surface of the magnetic head according to the first embodiment of the invention.
Figure 4:
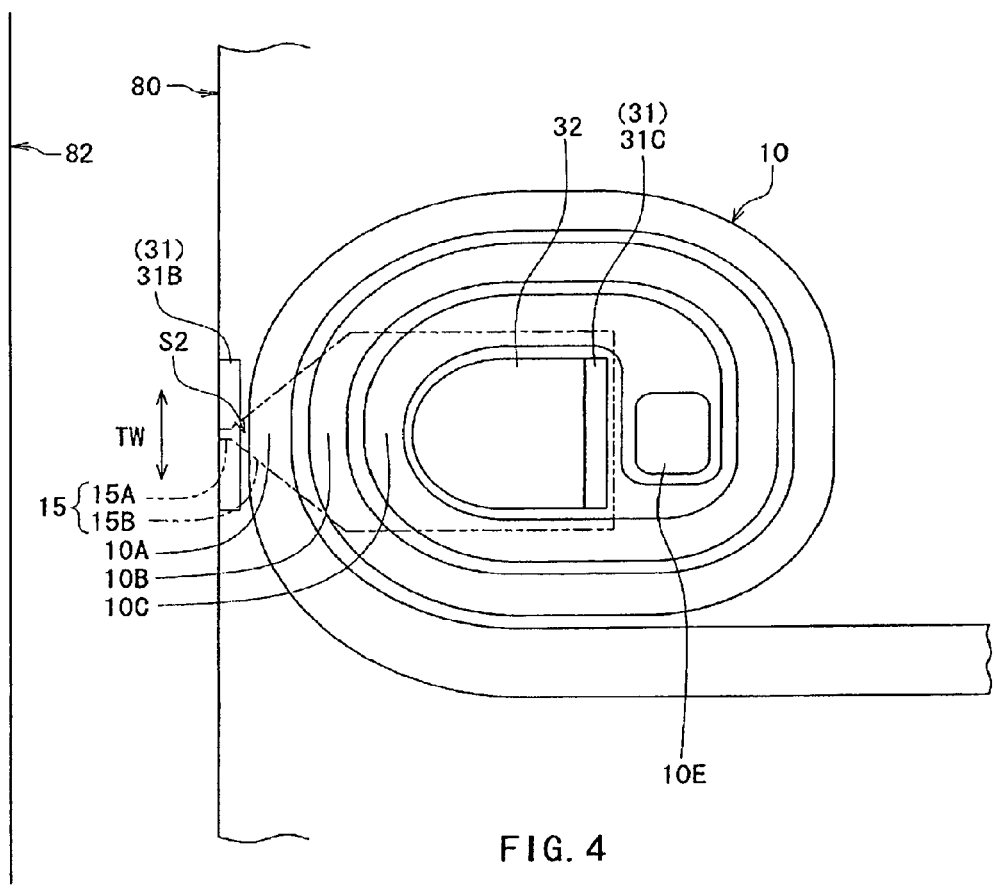
FIG. 4 is a plan view showing a second portion of a coil of the magnetic head according to the first embodiment of the invention.
Figure 5:
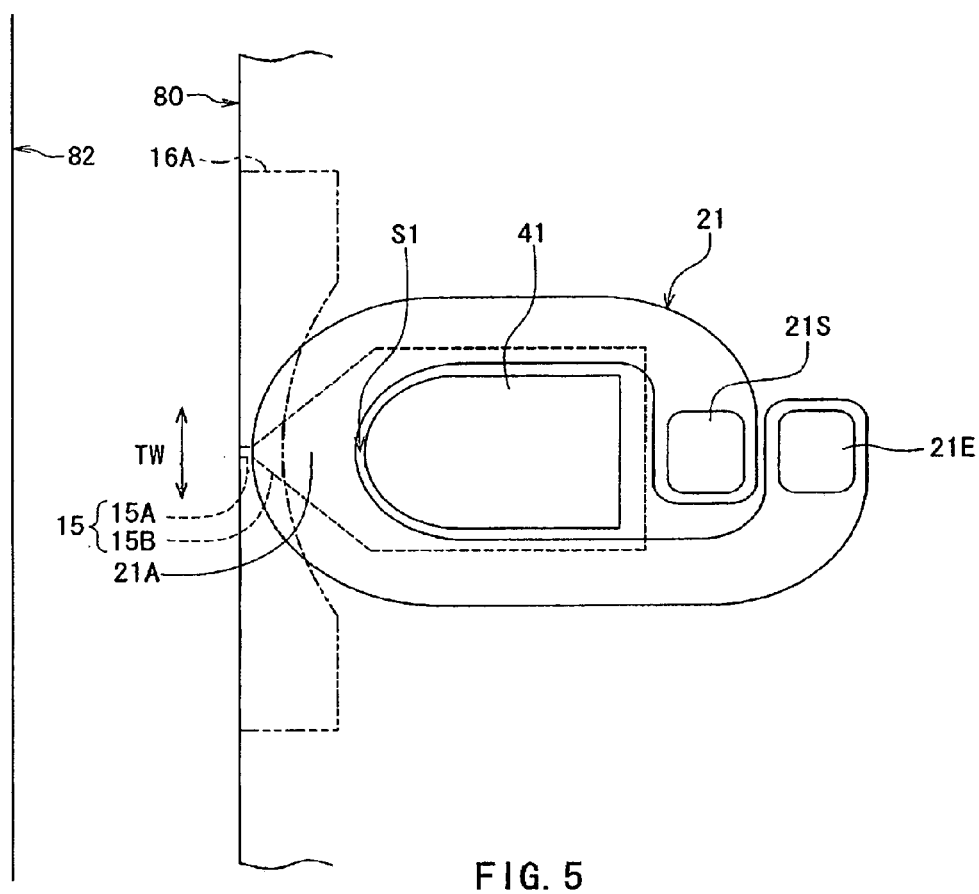
FIG. 5 is a plan view showing a first layer of a first portion of the coil of the magnetic head according to the first embodiment of the invention.
Figure 6:
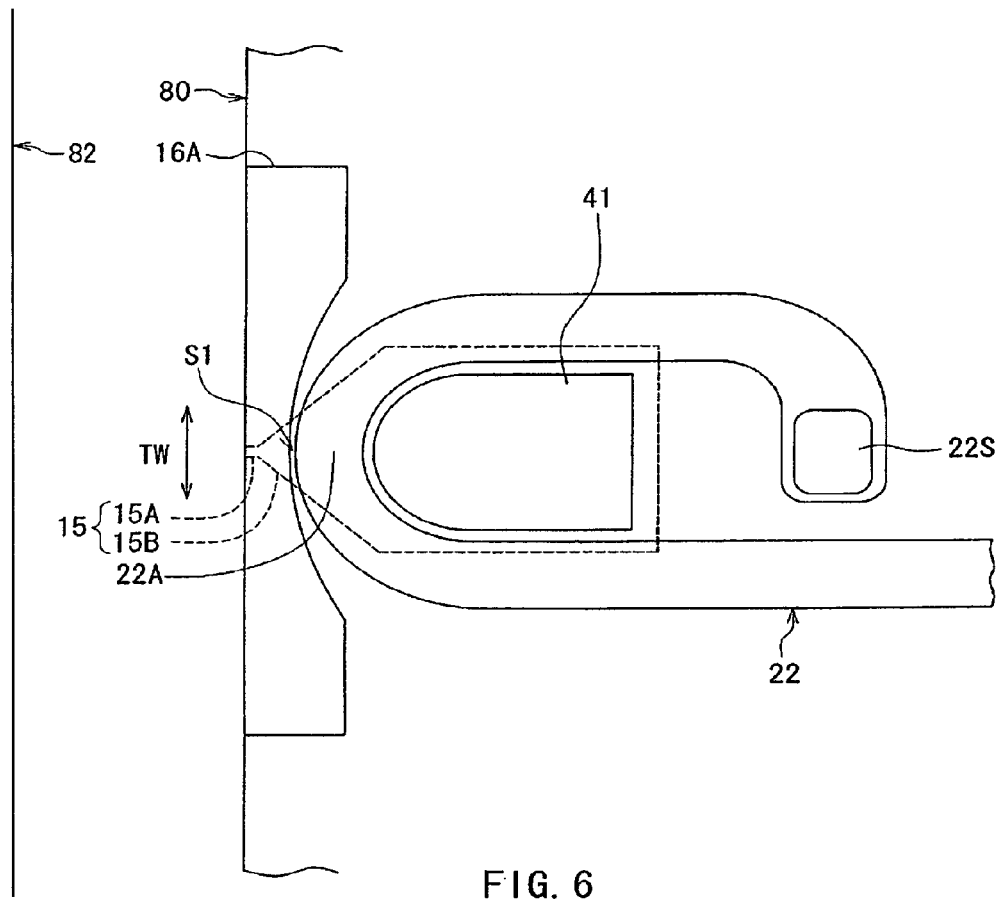
FIG. 6 is a plan view showing a second layer of the first portion of the coil of the magnetic head according to the first embodiment of the invention.

Embodiments of the present invention will now be described in detail with reference to the drawings. First, reference is made to FIG. 1 to FIG. 6 to describe the configuration of a magnetic head according to a first embodiment of the invention. FIG. 1 is a cross-sectional view showing the main part of the magnetic head according to the present embodiment. FIG. 2 is a cross-sectional view of the magnetic head according to the present embodiment. Note that FIG. 1 and FIG. 2 show cross sections perpendicular to the medium facing surface and to the top surface of the substrate. The arrows with the symbol T in FIG. 1 and FIG. 2 indicate the direction of travel of the recording medium. FIG. 3 is a front view showing the medium facing surface of the magnetic head according to the present embodiment. FIG. 4 is a plan view showing a second portion of a coil of the magnetic head according to the present embodiment. FIG. 5 is a plan view showing a first layer of a first portion of the coil of the magnetic head according to the present embodiment. FIG. 6 is a plan view showing a second layer of the first portion of the coil of the magnetic head according to the present embodiment. The arrows with the symbol TW in FIG. 3 to FIG. 6 indicate the track width direction.

As shown in FIG. 2 and FIG. 3, the magnetic head for perpendicular magnetic recording (hereinafter simply referred to as the magnetic head) according to the present embodiment includes: a substrate 1 made of a ceramic material such as aluminum oxide-titanium carbide (Al₂O₃—TiC) and having a top surface 1a; an insulating layer 2 made of an insulating material such as alumina (Al₂O₃) and disposed on the top surface 1a of the substrate 1; a first read shield layer 3 made of a magnetic material and disposed on the insulating layer 2; a first read shield gap film 4 which is an insulating film disposed to cover the first read shield layer 3; a magnetoresistive (MR) element 5 serving as a read element disposed on the first read shield gap film 4; a second read shield gap film 6 which is an insulating film disposed on the MR element 5; and a second read shield layer 7 made of a magnetic material and disposed on the second read shield gap film 6.

An end of the MR element 5 is located in a medium facing surface 80 that faces the recording medium. As shown in FIGS. 4 to 6, the medium facing surface 80 faces the recording medium 82. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the first read shield layer 3 to the second read shield layer 7 constitute a read head section 8. The magnetic head further includes: a nonmagnetic layer 71 made of a nonmagnetic material and disposed on the second read shield layer 7; a middle shield layer 72 made of a magnetic material and disposed on the nonmagnetic layer 71; and a write head section 9 disposed on the middle shield layer 72. The middle shield layer 72 has the function of shielding the MR element 5 from magnetic fields generated in the write head section 9. The nonmagnetic layer 71 is made of alumina, for example. The write head section 9 includes a coil, a main pole 15, a write shield 16, and a gap part 17.

The coil produces a magnetic field corresponding to data to be written on the recording medium. The coil includes a first portion 20 and a second portion 10. The first portion 20 and the second portion 10 are both made of a conductive material such as copper. The first portion 20 and the second portion 10 are connected in series or in parallel. The main pole 15 has an end face located in the medium facing surface 80. The main pole 15 allows a magnetic flux corresponding to the magnetic field produced by the coil to pass, and produces a write magnetic field for writing data on the recording medium by means of a perpendicular magnetic recording system. FIG. 1 and FIG. 2 each show a cross section that intersects the end face of the main pole 15 located in the medium facing surface 80 and that is perpendicular to the medium facing surface 80 and to the top surface 1a of the substrate 1 (the cross section will hereinafter be referred to as the main cross section).

The write shield 16 has an end face located in the medium facing surface 80. The end face of the write shield 16 includes first to fourth end face portions 16Aa, 16Ba, 16Ca, and 16Da. The first end face portion 16Aa is located on the front side in the direction T of travel of the recording medium relative to the end face of the main pole 15. The second end face portion 16Ba is located on the rear side in the direction T of travel of the recording medium relative to the end face of the main pole 15. The third and fourth end face portions 16Ca and 16Da are located on opposite sides of the end face of the main pole 15 in the track width direction TW. In the medium facing surface 80, the first to fourth end face portions 16Aa, 16Ba, 16Ca, and 16Da are arranged to wrap around the end face of the main pole 15.

The write shield 16 is made of a magnetic material. Examples of materials that can be used for the write shield 16 include CoFeN, CoNiFe, NiFe, and CoFe.

The write head section 9 further includes a first return path section 40 and a second return path section 30. The first return path section 40 and the second return path section 30 are both made of a magnetic material. Examples of materials that can be used for the first return path section 40 and the second return path section 30 include CoFeN, CoNiFe, NiFe, and CoFe. The first return path section 40 and the second return path section 30 align along a direction perpendicular to the top surface 1a of the substrate 1 with the main pole 15 interposed therebetween. The first return path section 40 is located on the front side in the direction T of travel of the recording medium relative to the main pole 15, and connects the write shield 16 and part of the main pole 15 away from the medium facing surface 80 to each other, thereby magnetically coupling the write shield 16 and the main pole 15 to each other. The second return path section 30 is located on the rear side in the direction T of travel of the recording medium relative to the main pole 15, and connects the write shield 16 and part of the main pole 15 away from the medium facing surface 80 to each other, thereby magnetically coupling the write shield 16 and the main pole 15 to each other.

The second return path section 30 includes magnetic layers 31, 32 and 33. The magnetic layer 31 includes a horizontal portion 31A, a first inclined portion 31B and a second inclined portion 31C. The horizontal portion 31A extends in a direction parallel to the top surface 1a of the substrate 1. The first inclined portion 31B extends from a part of the horizontal portion 31A, the part being in the vicinity of the end of the horizontal portion 31A closest to the medium facing surface 80, in the direction away from the top surface 1a of the substrate 1. The second inclined portion 31C extends from a part of the horizontal portion 31A, the part being in the vicinity of the end of the horizontal portion 31A farthest from the medium facing surface 80, in the direction away from the top surface 1a of the substrate 1. In the main cross section mentioned above, the distance between the first inclined portion 31B and the second inclined portion 31C in the direction perpendicular to the medium facing surface 80 increases with increasing distance from the top surface 1a of the substrate 1. In FIG. 2, the boundary between the horizontal portion 31A and the first inclined portion 31B and the boundary between the horizontal portion 31A and the second inclined portion 31C are shown by dotted lines.

The magnetic layer 32 is in contact with the horizontal portion 31A and the second inclined portion 31C and lies between the first inclined portion 31B and the second inclined portion 31C with a gap between the first inclined portion 31B and the magnetic layer 32. As shown in FIG. 4, the second portion 10 of the coil is wound approximately three turns around the second inclined portion 31C and the magnetic layer 32.

The magnetic head further includes an accommodation part 50 made of a nonmagnetic material and accommodating at least part of the second return path section 30. In the present embodiment, the accommodation part 50 accommodates the magnetic layers 31 and 32, in particular. The accommodation part 50 includes a nonmagnetic layer 51 and a nonmagnetic film 52. The nonmagnetic layer 51 is disposed on the middle shield layer 72. The nonmagnetic layer 51 has an opening 51a that penetrates the nonmagnetic layer 51 from its top surface to bottom surface. The opening 51a has a first wall face located outside of the outermost turn of the second portion 10 and a second wall face located inside of the innermost turn of the second portion 10. The first and second wall faces are inclined relative to the direction perpendicular to the top surface 1a of the substrate 1. More specifically, in the main cross section, the distance from the medium facing surface 80 to an arbitrary point on the first wall face decreases with increasing distance from the arbitrary point to the top surface 1a of the substrate 1. In the main cross section, the distance from the medium facing surface 80 to an arbitrary point on the second wall face increases with increasing distance from the arbitrary point to the top surface 1a of the substrate 1.

The magnetic layers 31 and 32 and the second portion 10 are located in the opening 51a of the nonmagnetic layer 51. The nonmagnetic film 52 is disposed to extend along the top surface of the nonmagnetic layer 51, the first and second wall faces of the opening 51a, and the top surface of the middle shield layer 72. The nonmagnetic layer 51 and the nonmagnetic film 52 are each made of an inorganic insulating material such as alumina.

The magnetic head further includes an electrode film 73 made of a nonmagnetic metal material and disposed along the nonmagnetic film 52. The electrode film 73 is used as an electrode and seed when the magnetic layer 31 is formed by plating. The electrode film 73 has a thickness in the range of 50 to 80 nm, for example. The electrode film 73 is made of Ru, for example.

The magnetic head further includes an insulating film 53 made of an insulating material and interposed between the second portion 10 and the magnetic layers 31 and 32, and an insulating layer 54 made of an insulating material and disposed between every two turns of the second portion 10 that are adjacent to each other. The top surfaces of the second portion 10, the magnetic layers 31 and 32, the insulating film 53, the insulating layer 54 and the electrode film 73 are even with each other. The insulating film 53 and the insulating layer 54 are made of alumina, for example.

As shown in FIG. 3, the write shield 16 includes a first shield 16A, a second shield 16B, and two side shields 16C and 16D. The two side shields 16C and 16D are located on opposite sides of the main pole 15 in the track width direction TW. The first shield 16A is located on the front side in the direction T of travel of the recording medium relative to the main pole 15. The second shield 16B is located on the rear side in the direction T of travel of the recording medium relative to the main pole 15. The side shields 16C and 16D magnetically couple the first shield 16A and the second shield 16B to each other.

As shown in FIG. 1, the first shield 16A has the first end face portion 16Aa and a first inclined surface 16Ab. The second shield 16B has the second end face portion 16Ba and a top surface including a second inclined surface 16Bb. The first inclined surface 16Ab and the second inclined surface 16Bb will be described in detail later. As shown in FIG. 3, the side shield 16C has the third end face portion 16Ca. The side shield 16D has the fourth end face portion 16Da.

The second shield 16B is disposed on the first inclined portion 31B of the magnetic layer 31. The magnetic layer 33 is disposed over the second inclined portion 31C of the magnetic layer 31 and the magnetic layer 32. The magnetic head further includes an insulating layer 55 made of an insulating material and a nonmagnetic layer 56 made of a nonmagnetic material. The insulating layer 55 is disposed over the top surfaces of the second portion 10, the insulating film 53 and the insulating layer 54, and surrounds the second shield 16B and the magnetic layer 33. The nonmagnetic layer 56 is disposed over the insulating layer 55 and the electrode film 73.

The insulating layer 55 and the nonmagnetic layer 56 are made of alumina, for example.

The main pole 15 has a top surface 15T (see FIG. 1), which is a surface located at an end on the front side in the direction T of travel of the recording medium, and a bottom end 15L (see FIG. 1) opposite to the top surface 15T. The main pole 15 further has first and second side parts (see FIG. 3) that are opposite to each other in the track width direction TW. The side shield 16C has a first sidewall opposed to the first side part of the main pole 15. The side shield 16D has a second sidewall opposed to the second side part of the main pole 15.

The gap part 17 is interposed between the main pole 15 and the write shield 16. The magnetic head further includes an insulating layer 19 made of an insulating material and a gap layer 18 made of a nonmagnetic material. A portion of the insulating layer 19 constitutes a portion of the gap part 17. A portion of the gap layer 18 constitutes another portion of the gap part 17. The portion of the insulating layer 19 constituting the portion of the gap part 17 lies between the main pole 15 and the first shield 16A. The portion of the gap layer 18 constituting the other portion of the gap part 17 lies between the main pole 15 and each of the second shield 16B and the side shields 16C and 16D.

The side shields 16C and 16D are disposed on the second shield 16B and in contact with the top surface of the second shield 16B. The gap layer 18 is arranged to extend along the sidewalls of the side shields 16C and 16D, the top surface of the second shield 16B and the top surface of the nonmagnetic layer 56. The nonmagnetic material employed to form the gap layer 18 may be an insulating material or a nonmagnetic metal material. Alumina is an example of an insulating material that can be used to form the gap layer 18. Ru is an example of a nonmagnetic metal material that can be used to form the gap layer 18.

The main pole 15 is disposed over the second shield 16B and the nonmagnetic layer 56 such that the gap layer 18 is interposed between the main pole 15 and the top surfaces of the second shield 16B and the nonmagnetic layer 56. As shown in FIG. 3, the gap layer 18 is interposed also between the main pole 15 and each of the side shields 16C and 16D.

The bottom end 15L of the main pole 15 is in contact with the top surface of the magnetic layer 33 at a position away from the medium facing surface 80. The main pole 15 is made of a magnetic metal material. Examples of materials that can be used for the main pole 15 include NiFe, CoNiFe, and CoFe. The shape of the main pole 15 will be described in detail later.

The magnetic head further includes a nonmagnetic layer 57 made of a nonmagnetic material and disposed around the main pole 15 and the side shields 16C and 16D. The nonmagnetic layer 57 is made of alumina, for example.

The magnetic head further includes an insulating layer 58 made of an insulating material and disposed on part of the top surface 15T of the main pole 15 at a position away from the medium facing surface 80. The insulating layer 58 is made of alumina, for example.

The first return path section 40 includes a columnar portion 41 and a magnetic layer 42. The columnar portion 41 is disposed on the main pole 15 at a position away from the medium facing surface 80.

The first portion 20 of the coil includes a first layer 21 and a second layer 22. The first layer 21 is disposed on the insulating layer 58. As shown in FIG. 5, the first layer 21 is wound one turn around the columnar portion 41. The magnetic head further includes an insulating layer 59 disposed on the first layer 21. The insulating layer 59 is made of alumina, for example.

The insulating layer 19 is disposed to cover the main pole 15, the first layer 21 and the insulating layers 58 and 59. The insulating layer 19 is made of alumina, for example. The insulating layer 59 may be omitted. In this case, the insulating layer 19 covers the top surface of the first layer 21.

The first shield 16A is disposed over the side shields 16C and 16D and the insulating layer 19, and is in contact with the top surfaces of the side shields 16C and 16D and the insulating layer 19. In the medium facing surface 80, part of the first end face portion 16Aa of the first shield 16A is spaced from the end face of the main pole 15 by a predetermined distance created by the thickness of the insulating layer 19. The thickness of the insulating layer 19 preferably falls within the range of 5 to 60 nm, and may be 15 to 30 nm, for example. The end face of the main pole 15 has a side that is adjacent to the insulating layer 19, and the side defines the track width.

Each of the insulating layers 58 and 59 has an end face facing toward the first inclined surface 16Ab of the first shield 16A. The distance from the medium facing surface 80 to an arbitrary point on the end face of each of the insulating layers 58 and 59 increases with increasing distance from the arbitrary point to the top surface 1a of the substrate 1.

The second layer 22 is located above the first layer 21. As shown in FIG. 6, the second layer 22 is wound approximately one turn around the columnar portion 41. The magnetic head further includes an insulating film 61 made of an insulating material and a nonmagnetic layer 62 made of a nonmagnetic material. The insulating film 61 is interposed between the second layer 22 and each of the first shield 16A, the insulating layer 19 and the columnar portion 41. The nonmagnetic layer 62 is disposed around the insulating film 61, the first layer 21, the second layer 22, the first shield 16A and the columnar portion 41. The insulating film 61 and the nonmagnetic layer 62 are made of alumina, for example. The top surfaces of the first shield 16A, the second layer 22, the columnar portion 41, the insulating film 61 and the nonmagnetic layer 62 are even with each other.

The magnetic head further includes an insulating layer 63 made of an insulating material and disposed over the top surfaces of the second layer 22 and the insulating film 61. The insulating layer 63 is made of alumina, for example. The magnetic layer 42 is disposed over the first shield 16A, the columnar portion 41 and the insulating layer 63, and connects the first shield 16A and the columnar portion 41 to each other.

The magnetic head further includes a protective layer 70 made of a nonmagnetic material and disposed to cover the write head section 9. The protective layer 70 is made of, for example, an inorganic, insulating material such as alumina.

As has been described, the magnetic head according to the present embodiment includes the medium facing surface 80, the read head section 8, and the write head section 9. The medium facing surface 80 faces the recording medium. The read head section 8 and the write head section 9 are stacked on the substrate 1. The read head section 8 is located on the rear side in the direction T of travel of the recording medium (i.e., located on the leading side) relative to the write head section 9.

The read head section 8 includes: the MR element 5 serving as the read element; the first read shield layer 3 and the second read shield layer 7 for shielding the MR element 5, with their respective portions near the medium facing surface 80 opposed to each other with the MR element 5 therebetween; the first read shield gap film 4 disposed between the MR element 5 and the first read shield layer 3; and the second read shield gap film 6 disposed between the MR element 5 and the second read shield layer 7.

The write head section 9 includes the coil including the first portion 20 and the second portion 10, the main pole 15, the write shield 16, the gap part 17, the first return path section 40, the second return path section 30, and the accommodation part 50. The write shield 16 includes the first shield 16A, the second shield 16B, and the two side shields 16C and 16D. The gap part 17 is composed of part of the insulating layer 19 and part of the gap layer 18. The first return path section 40 and the second return path section 30 align along the direction perpendicular to the top surface 1a of the substrate 1 with the main pole 15 interposed therebetween.

The second return path section 30 includes the magnetic layers 31, 32 and 33, and is located on the rear side in the direction T of travel of the recording medium relative to the main pole 15. As shown in FIG. 2, the second return path section 30 connects the write shield 16 and part of the main pole 15 away from the medium facing surface 80 to each other so that a second space S2 is defined by the main pole 15, the gap part 17 (part of the gap layer 18), the write shield 16 and the second return path section 30 (the magnetic layers 31 to 33). The accommodation part 50 accommodates at least part of the second return path section 30.

The first return path section 40 includes the columnar portion 41 and the magnetic layer 42, and is located on the front side in the direction T of travel of the recording medium relative to the main pole 15. The first return path section 40 connects the write shield 16 and part of the main pole 15 away from the medium facing surface 80 to each other so that a first space S1 is defined by the main pole 15, the gap part 17 (part of the insulating layer 19), the write shield 16 and the first return path section 40 (the columnar portion 41 and the magnetic layer 42).

The first portion 20 and the second portion 10 of the coil will now be described in detail with reference to FIG. 1 and FIG. 4 to FIG. 6. FIG. 4 is a plan view showing the second portion 10. As previously mentioned, the second portion 10 is wound approximately three turns around the second inclined portion 31C and the magnetic layer 32. The second portion 10 includes three coil elements 10A, 10B and 10C extending to pass through the second space S2. Note that the coil elements refer to part of the coil winding. The coil elements 10A, 10B and 10C align in this order in the direction perpendicular to the medium facing surface 80, the coil element 10A being closest to the medium facing surface 80. The coil elements 10A, 10B and 10C correspond to the at least one second coil element according to the invention. The second portion 10 has a coil connection part 10E electrically connected to the first portion 20.

FIG. 5 is a plan view showing the first layer 21 of the first portion 20. As previously mentioned, the first layer 21 is wound one turn around the columnar portion 41. The first layer 21 includes a coil element 21A extending to pass between the first shield 16A and the columnar portion 41, in particular, within the first space S1. As shown in FIG. 1, the coil element 21A has an end face 21Aa facing toward the first inclined surface 16Ab of the first shield 16A. The distance from the medium facing surface 80 to an arbitrary point on the end face 21Aa of the coil element 21A increases with increasing distance from the arbitrary point to the top surface 1a of the substrate 1.

The first layer 21 has a coil connection part 21S electrically connected to the coil connection part 10E of the second portion 10, and a coil connection part 21E electrically connected to the second layer 22. The coil connection part 21S is electrically connected to the coil connection part 10E via a connection layer of columnar shape (not shown) that penetrates a plurality of layers interposed between the first layer 21 and the second portion 10. The connection layer is made of a conductive material such as copper.

FIG. 6 is a plan view showing the second layer 22 of the first portion 20. As previously mentioned, the second layer 22 is wound approximately one turn around the columnar portion 41. The second layer 22 includes a coil element 22A extending to pass between the first shield 16A and the columnar portion 41, in particular, within the first space S1. The second layer 22 has a coil connection part 22S penetrating the insulating layer 63 and the insulating film 64 and electrically connected to the coil connection part 21E of the first layer 21. In the example shown in FIG. 4 to FIG. 6, the first portion 20 and the second portion 10 are connected in series.

The coil elements 21A and 22A correspond to the at least one first coil element according to the invention. The at least one first coil element includes one specific coil element. In the present embodiment, the coil element 21A is the specific coil element.

The shapes of the main pole 15, the first and second shields 16A and 16B and the coil element 21A will now be described in detail with reference to FIG. 1 and FIG. 4 to FIG. 6. As shown in FIG. 4 to FIG. 6, the main pole 15 includes a track width defining portion 15A and a wide portion 15B. The track width defining portion 15A has an end face located in the medium facing surface 80, and an end opposite to the end face. The wide portion 15B is connected to the end of the track width defining portion 15A. As shown in FIG. 1, the main pole 15 has the top surface 15T located at the end on the front side in the direction T of travel of the recording medium, the bottom end 15L opposite to the top surface 15T, the first side part, and the second side part. The width of the top surface 15T in the track width direction TW is greater in the wide portion 15B than in the track width defining portion 15A.

In the track width defining portion 15A, the width of the top surface 15T in the track width direction TW is generally constant regardless of the distance from the medium facing surface 80. In the wide portion 15B, the width of the top surface 15T in the track width direction TW is, for example, equal to that in the track width defining portion 15A when seen at the boundary between the track width defining portion 15A and the wide portion 15B, and gradually increases with increasing distance from the medium facing surface 80, then becoming constant. Here, the length of the track width defining portion 15A in the direction perpendicular to the medium facing surface 80 will be referred to as the neck height. The neck height falls within the range of 0 to 0.3 μm, for example. A zero neck height means that no track width defining portion 15A exists and an end face of the wide portion 15B is thus located in the medium facing surface 80.

The top surface 15T includes an inclined portion 15T1 and a flat portion 15T2 arranged in this order, the inclined portion 15T1 being closer to the medium facing surface 80. The inclined portion 15T1 has a first end located in the medium facing surface 80 and a second end opposite to the first end. The flat portion 15T2 is connected to the second end of the inclined portion 15T1.

The bottom end 15L includes an inclined portion 15L1 and a flat portion 15L2 arranged in this order, the inclined portion 15L1 being closer to the medium facing surface 80. The inclined portion 15L1 has a first end located in the medium facing surface 80 and a second end opposite to the first end. The inclined portion 15L1 may be an edge formed by two intersecting planes, or may be a plane connecting two planes to each other. The flat portion 15L2 is a plane connected to the second end of the inclined portion 15L1.

Here, as shown in FIG. 1, assume a first virtual plane P1 that passes through the first end of the inclined portion 15T1 of the top surface 15T and is perpendicular to the medium facing surface 80 and to the direction T of travel of the recording medium. The inclined portion 15T1 is inclined relative to the first virtual plane P1 and the medium facing surface 80 such that the second end of the inclined portion 15T1 is located on the front side in the direction T of travel of the recording medium relative to the first virtual plane P1. The flat portion 15T2 extends in a direction substantially perpendicular to the medium facing surface 80.

Assume also a second virtual plane P2 that passes through the first end of the inclined portion 15L1 of the bottom end 15L and is perpendicular to the medium facing surface 80 and to the direction T of travel of the recording medium. The inclined portion 15L1 is inclined relative to the second virtual plane P2 and the medium facing surface 80 such that the second end of the inclined portion 15L1 is located on the rear side in the direction T of travel of the recording medium relative to the second virtual plane P2. The flat portion 15L2 extends in a direction substantially perpendicular to the medium facing surface 80.

As previously mentioned, the first shield 16A of the write shield 16 has the first inclined surface 16Ab. The first inclined surface 16Ab faces toward the top surface 15T of the main pole 15. The first inclined surface 16Ab has a third end located in the medium facing surface 80 and a fourth end opposite to the third end. The first inclined surface 16Ab is inclined relative to the first and second virtual planes P1 and P2 and the medium facing surface 80 such that the fourth end is located farther from the first and second virtual planes P1 and P2 than is the third end.

The first inclined surface 16Ab includes a first portion 16Ab1 that is opposed to the inclined portion 15T1 of the top surface 15T with the gap part 17 (part of the insulating layer 19) interposed therebetween, and a second portion 16Ab2 that is contiguous with the first portion 16Ab1 and is located farther from the medium facing surface 80 than is the first portion 16Ab1. The specific coil element 21A includes a portion 21A1 that is located closer to the medium facing surface 80 than is the fourth end of the first inclined surface 16Ab and interposed between the flat portion 15T2 of the top surface 15T and the second portion 16Ab2 of the first inclined surface 16Ab.

The columnar portion 41 of the first return path section 40 is disposed such that the specific coil element 21A is interposed between the columnar portion 41 and the first inclined surface 16Ab. The insulating layer 58 is disposed between the specific coil element 21A and the flat portion 15T2 of the top surface 15T. The insulating layer 59 is disposed on the specific coil element 21A. The inclined portion 15T1 of the top surface 15T, the end face of the insulating layer 58, the end face 21Aa of the specific coil element 21A, and the end face of the insulating layer 59 are located in one plane.

As previously mentioned, the second shield 16B of the write shield 16 has the top surface including the second inclined surface 16Bb. The second inclined surface 16Bb is inclined relative to the first and second virtual planes P1 and P2 and the medium facing surface 80. The top surface of the second shield 16B further includes a flat portion and a connecting surface. The flat portion is located farther from the medium facing surface 80 than is the second inclined surface 16Bb and closer to the top surface 1a of the substrate 1 than is the second inclined surface 16Bb. The connecting surface connects the second inclined surface 16Bb and the flat portion to each other. The flat portion extends in a direction substantially perpendicular to the medium facing surface 80.

Here, as shown in FIG. 1, the length of the inclined portion 15T1 of the top surface 15T in the direction perpendicular to the medium facing surface 80 will be represented by the symbol $L_A$, the length of the inclined portion 15L1 of the bottom end 15L in the direction perpendicular to the medium facing surface 80 will be represented by the symbol $L_B$, and the length of the first inclined surface 16Ab in the direction perpendicular to the medium facing surface 80 will be represented by the symbol $L_C$. The length $L_A$ is smaller than the length $L_C$. The length $L_A$ falls within the range of 0.05 to 0.15 μm, for example. The length $L_B$ falls within the range of 0.1 to 0.5 μm, for example. The length $L_C$ falls within the range of 0.1 to 0.4 μm, for example. Note that the neck height can be set to any value independently of the lengths $L_A$, $L_B$ and $L_C$ mentioned above.

The minimum distance between the specific coil element 21A and the medium facing surface 80 will be represented by the symbol $L_D$, and the minimum distance between the columnar portion 41 and the medium facing surface 80 will be represented by the symbol $L_E$. The distance $L_D$ falls within the range of 0.1 to 0.15 μm, for example. The distance $L_E$ falls within the range of 0.7 to 1.2 μm, for example. In the main cross section, the length of the coil element 22A in the direction perpendicular to the medium facing surface 80 is about 0.4 μm, for example. In the main cross section, the thickness of the insulating film 61 in the direction perpendicular to the medium facing surface 80 is in the range of 0.1 to 0.2 μm, for example.

The angle of inclination of the inclined portion 15T1 of the top surface 15T relative to the first virtual plane P1 will be represented by the symbol $\theta_{T1}$, and the angle of inclination of the inclined portion 15L1 of the bottom end 15L relative to the second virtual plane P2 will be represented by the symbol $\theta_{L1}$. The angle of inclination $\theta_{T1}$ falls within the range of 22° to 35°, for example. The angle of inclination $\theta_{T1}$ falls within the range of 30° to 50°, for example.

The thickness of the main pole 15 in the medium facing surface 80, i.e., the distance between the first virtual plane P1 and the second virtual plane P2, will be represented by the symbol D0. The distance between the flat portion 15T2 of the top surface 15T and the first virtual plane P1 will be represented by the symbol D1. The distance between the flat portion 15L2 of the bottom end 15L and the second virtual plane P2 will be represented by the symbol D2. The distance D0 falls within the range of 0.05 to 0.1 μm, for example. The distance D1 falls within the range of 0.02 to 0.1 μm, for example. The distance D2 falls within the range of 0.1 to 0.5 μm, for example.

The distance between the specific coil element 21A and the flat portion 15T2 of the top surface 15T of the main pole 15 will be represented by the symbol D5. In the present embodiment, the distance D5 is equal to the thickness of the insulating layer 58. The distance D5 falls within the range of 5 to 100 nm, for example. The thickness of the specific coil element 21A will be represented by the symbol D6, and the thickness of the insulating layer 59 will be represented by the symbol D7. The thickness D6 falls within the range of 0.3 to 0.7 μm, for example. The thickness D7 falls within the range of 0 to 100 nm, for example. The thickness D7 of zero means that the insulating layer 59 is not provided.

The end face of the main pole 15 located in the medium facing surface 80 has a first side adjacent to the insulating layer 19, a second side connected to one end of the first side, and a third side connected to the other end of the first side. The first side defines the track width. The position of an end of a record bit to be recorded on the recording medium depends on the position of the first side. The end face of the main pole 15 located in the medium facing surface 80 decreases in width in the track width direction TW with increasing distance from the first side, that is, with increasing distance from the first virtual plane P1. Each of the second side and the third side forms an angle of, for example, 7° to 17°, or preferably 10° to 15°, relative to a direction perpendicular to the first virtual plane P1. The first side has a length in the range of 0.05 to 0.20 μm, for example.

The function and effects of the magnetic head according to the present embodiment will now be described. The magnetic head writes data on the recording medium by using the write head section 9 and reads data stored on the recording medium by using the read head section 8. In the write head section 9, the coil including the first portion 20 and the second portion 10 produces magnetic fields corresponding to data to be written on the recording medium. A magnetic flux corresponding to the magnetic field produced by the first portion 20 passes through the first return path section 40 and the main pole 15. A magnetic flux corresponding to the magnetic field produced by the second portion 10 passes through the second return path section 30 and the main pole 15. Consequently, the main pole 15 allows the magnetic flux corresponding to the magnetic field produced by the first portion 20 and the magnetic flux corresponding to the magnetic field produced by the second portion 10 to pass.

The first portion 20 and the second portion 10 may be connected in series or in parallel. In either case, the first portion 20 and the second portion 10 are connected such that the magnetic flux corresponding to the magnetic field produced by the first portion 20 and the magnetic flux corresponding to the magnetic field produced by the second portion 10 flow in the same direction through the main pole 15.

The main pole 15 allows the magnetic fluxes corresponding to the magnetic fields produced by the coil to pass as mentioned above, and produces a write magnetic field for writing data on the recording medium by means of the perpendicular magnetic recording system.

The write shield 16 captures a disturbance magnetic field applied to the magnetic head from the outside thereof. This makes it possible to prevent erroneous writing on the recording medium induced by the disturbance magnetic field intensively captured into the main pole 15. The write shield 16 also has the function of capturing a magnetic flux produced from the end face of the main pole 15 and spreading in directions other than the direction perpendicular to the plane of the recording medium, so as to prevent the magnetic flux from reaching the recording medium.

Furthermore, the write shield 16, the first return path section 40 and the second return path section 30 have the function of allowing a magnetic flux that has been produced from the end face of the main pole 15 and has magnetized the recording medium to flow back. More specifically, a part of the magnetic flux that has been produced from the end face of the main pole 15 and has magnetized the recording medium flows back to the main pole 15 through the write shield 16 and the first return path section 40. Another part of the magnetic flux that has been produced from the end face of the main pole 15 and has magnetized the recording medium flows back to the main pole 15 through the write shield 16 and the second return path section 30.

The write shield 16 includes the first shield 16A, the second shield 16B, and the two side shields 16C and 16D. The present embodiment thus makes it possible that, in regions on both the front side and the rear side in the direction T of travel of the recording medium relative to the end face of the main pole 15 and regions on opposite sides of the end face of the main pole 15 in the track width direction TW, a magnetic flux that is produced from the end face of the main pole 15 and spreads in directions other than the direction perpendicular to the plane of the recording medium can be captured and thereby prevented from reaching the recording medium Consequently, the present embodiment makes it possible to prevent adjacent track erasure induced by a skew. The first and second shields 16A and 16B contribute not only to the prevention of adjacent track erasure induced by a skew but also to an increase in the gradient of the write magnetic field. The side shields 16C and 16D greatly contribute to the prevention of adjacent track erasure, in particular. According to the present embodiment, such functions of the write shield 16 serve to increase the recording density.

Furthermore, as shown in FIG. 3, the present embodiment is configured so that in the medium facing surface 80, the distance between the first and second side parts of the main pole 15 in the track width direction TW, i.e., the width of the end face of the main pole 15, decreases with increasing distance from the first virtual plane P1. According to the present embodiment, this feature also serves to prevent adjacent track erasure induced by a skew.

The present embodiment is also configured so that in the medium facing surface 80, the distance between the first and second sidewalls of the side shields 16C and 16D in the track width direction TW decreases with increasing distance from the first virtual plane P1, as does the distance between the first and second side parts of the main pole 15. The present embodiment thus allows both the distance between the first side part and the first sidewall and the distance between the second side part and the second sidewall to be small and constant in the medium facing surface 80. This configuration allows the side shields 16C and 16D to efficiently capture the magnetic flux that is produced from the end face of the main pole 15 and spreads out to opposite areas in the track width direction TW. Consequently, according to the present embodiment, it is possible to enhance the function of the side shields 16C and 16D in particular, and to thereby enable more effective prevention of adjacent track erasure induced by a skew.

The write shield 16 cannot capture much magnetic flux if the write shield 16 is not magnetically connected with any magnetic layer having a sufficiently large volume enough to accommodate the magnetic flux captured by the write shield 16. In the present embodiment, there are provided the first return path section 40 (the columnar portion 41 and the magnetic layer 42) which magnetically couples the first shield 16A of the write shield 16 and the main pole 15 to each other, and the second return path section 30 (the magnetic layers 31 to 33) which magnetically couples the second shield 16B of the write shield 16 and the main pole 15 to each other. Such a configuration allows the magnetic flux captured by the write shield 16 to flow into the main pole 15 by way of the first return path section 40 and the second return path section 30. In the present embodiment, the first return path section 40, the second return path section 30 and the main pole 15, which are magnetic layers large in volume, are magnetically connected to the write shield 16. This allows the write shield 16 to capture much magnetic flux, so that the above-described effect of the write shield 16 can be exerted effectively.

Furthermore, in the present embodiment, the top surface 15T of the main pole 15 includes the inclined portion 15T1 inclined relative to the first virtual plane P1 and the medium facing surface 80, while the bottom end 15L of the main pole 15 includes the inclined portion 15L1 inclined relative to the second virtual plane P2 and the medium facing surface 80. This allows the main pole 15 to have a small thickness in the medium facing surface 80, thereby allowing the prevention of adjacent track erasure induced by a skew. On the other hand, since a portion of the main pole 15 away from the medium facing surface 80 can have a large thickness, it is possible for the main pole 15 to direct much magnetic flux to the medium facing surface 80, and this allows the improvement of write characteristics such as the overwrite property.

In the present embodiment, the length $L_A$ of the inclined portion 15T1 in the direction perpendicular to the medium facing surface 80 is smaller than the length $L_C$ of the first inclined surface 16Ab of the first shield 16A in direction perpendicular to the medium facing surface 80. This allows the inclined portion 15T1 and the first inclined surface 16Ab to be opposed to each other over a smaller area, thereby making it possible to prevent magnetic flux leakage from the main pole 15 to the write shield 16.

By virtue of the features of the shape of the main pole 15 and the features associated with the relation between the main pole 15 and the write shield 16 (the first shield 16A) described above, the present embodiment allows prevention of the occurrence of problems induced by a skew and is capable of providing improved write characteristics.

In the present embodiment, the first layer 21 of the coil includes the specific coil element 21A extending to pass between the first shield 16A and the columnar portion 41, in particular, within the first space S1. The coil element 21A includes the portion 21A1 interposed between the flat portion 15T2 of the top surface 15T and the second portion 16Ab2 of the first inclined surface 16Ab. More specifically, in the present embodiment, the portion 21A1 of the specific coil element 21A is disposed in a space between the flat portion 15T2 and the second portion 16Ab2, the space resulting from the features associated with the relation between the main pole 15 and the write shield 16 described above. According to the present embodiment, it is thus possible to dispose coil elements in the first space S1 with a high space utilization efficiency. This allows a reduction in length of the magnetic path passing through the write shield 16, the first return path section 40 and the main pole 15. Consequently, according to the present embodiment, it is possible to improve the rate of change in the direction of the magnetic flux produced from the end face of the main pole 15.

A method of manufacturing the magnetic head according to the present embodiment will now be described. In the method of manufacturing the magnetic head according to the present embodiment, first, as shown in FIG. 2 and FIG. 3, the insulating layer 2, the first read shield layer 3, and the first read shield gap film 4 are formed in this order on the substrate 1. Next, the MR element 5 and not-shown leads connected to the MR element 5 are formed on the first read shield gap film 4. The MR element 5 and the leads are then covered with the second read shield gap film 6. Then, the second read shield layer 7, the nonmagnetic layer 71 and the middle shield layer 72 are formed in this order on the second read shield gap film 6.

Next, the nonmagnetic layer 51 is formed over the entire top surface of the stack. A photoresist mask (not shown) is then formed on the nonmagnetic layer 51. This photoresist mask is formed by patterning a photoresist layer. Note that any photoresist mask to be employed in any subsequent step is formed in the same manner as this photoresist mask. Then, using the photoresist mask as an etching mask, the nonmagnetic layer 51 is taper-etched by, for example, reactive ion etching (hereinafter referred to as RIE) to form the opening 51a in the nonmagnetic layer 51. The middle shield layer 72 functions as an etching stopper for stopping the etching when the nonmagnetic layer 51 is etched by RIE. The photoresist mask is then removed.

Next, the nonmagnetic film 52 is formed over the entire top surface of the stack. Where alumina is selected as the material of the nonmagnetic film 52, the nonmagnetic film 52 is formed by atomic layer deposition (hereinafter referred to as ALD), for example. Then, the electrode film 73 is formed over the entire top surface of the stack by sputtering or ion beam deposition, for example. The magnetic layer 31 is then formed by frame plating, using the electrode film 73 as an electrode and seed layer. Part of the magnetic layer 31 is located above the top surface of the nonmagnetic layer 51. Next, the magnetic layer 32 is formed on the magnetic layer 31 by frame plating, using the electrode film 73 as an electrode. The magnetic layer 32 is formed such that its top surface is higher in level than the part of the magnetic layer 31 located above the top surface of the nonmagnetic layer 51.

Next, the insulating film 53 is formed over the entire top surface of the stack. Where alumina is selected as the material of the insulating film 53, the insulating film 53 is formed by ALD, for example. The second portion 10 of the coil is then formed by frame plating, for example. The outermost turn of the second portion 10 is formed such that a part thereof lies over a part of the insulating film 53 that is located above the top surface of the nonmagnetic layer 51. The innermost turn of the second portion 10 is formed such that a part thereof lies over a part of the insulating film 53 that is located above the top surface of the magnetic layer 32. Then, the insulating layer 54 is formed to fill the space between adjacent turns of the second portion 10 and cover the second portion 10. Where alumina is selected as the material of the insulating layer 54, the insulating layer 54 is formed by ALD, for example. The second portion 10, the magnetic layers 31 and 32, the insulating film 53 and the insulating layer 54 are then polished by, for example, chemical mechanical polishing (hereinafter referred to as CMP), until the electrode film 73 is exposed. In this polishing process, the electrode film 73 functions as a polishing stopper for stopping the polishing.

The insulating layer 55 is then formed over the second portion 10, the insulating film 53 and the insulating layer 54. Next, the second shield 16B is formed over the first inclined portion 31B of the magnetic layer 31 and the electrode film 73, and the magnetic layer 33 is formed over the second inclined portion 31C of the magnetic layer 31 and the magnetic layer 32, by performing, for example, frame plating with the electrode film 73 used as an electrode. Then, a portion of the second shield 16B is etched by ion beam etching (hereinafter referred to as IBE), for example. This etching is performed to determine the length of the second inclined surface 16Bb of the second shield 16B, which is to be formed later, in the direction perpendicular to the medium facing surface 80. Next, the nonmagnetic layer 56 is formed over the entire top surface of the stack. The nonmagnetic layer 56 is then polished by, for example, CMP, until the second shield 16B and the magnetic layer 33 are exposed. Next, part of the second shield 16B and part of the magnetic layer 33 are etched by, for example, IBE, so as to provide the second shield 16B with the second inclined surface 16Bb and to chamfer corners at the edge of the top surface of the magnetic layer 33.

Next, the side shields 16C and 16D are formed on the second shield 16B by, for example, frame plating using the electrode film 73 as an electrode. Next, the gap layer 18 is formed to cover the second shield 16B and the side shields 16C and 16D. Where alumina is selected as the material of the gap layer 18, the gap layer 18 is formed by ALD, for example. Where Ru is selected as the material of the gap layer 18, the gap layer 18 is formed by chemical vapor deposition, for example. Next, the gap layer 18 is selectively etched to form therein an opening for exposing the top surface of the magnetic layer 33. The gap layer 18, the insulating layer 55 and the nonmagnetic layer 56 are also selectively etched so that the coil connection part 10E (see FIG. 4) of the second portion 10 of the coil is exposed.

Now, with reference to FIG. 7A through FIG. 10B, a description will be given of a series of steps up to the step of forming the second layer 22 of the first portion 20 of the coil following the above-described step. FIG. 7A through FIG. 10B each show a stack of layers formed in the process of manufacturing the magnetic head. FIG. 7A to FIG. 10A each show a cross section perpendicular to the medium facing surface 80 and to the top surface 1a of the substrate 1, or the main cross section, in particular. FIG. 7B to FIG. 10B each show a cross section taken at the position at which the medium facing surface 80 is to be formed. The symbol "ABS" in FIG. 7A to FIG. 10A indicates the position at which the medium facing surface 80 is to be formed.

Figure 7A:
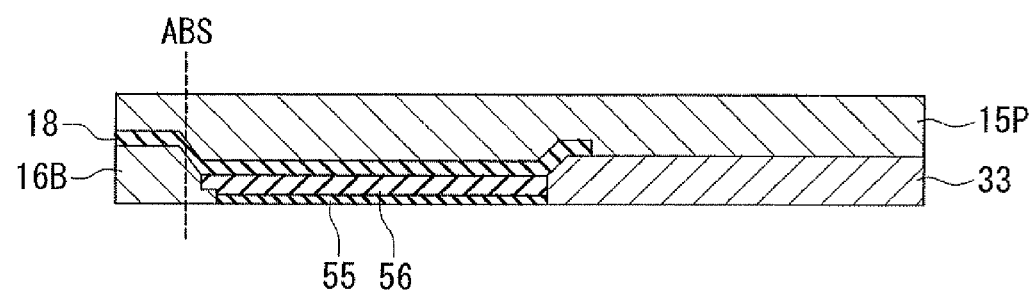
FIG. 7A and FIG. 7B are cross-sectional views showing a step of a method of manufacturing the magnetic head according to the first embodiment of the invention.
Figure 7B:
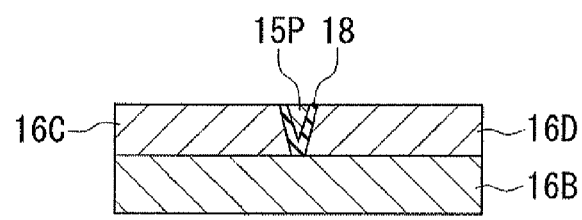

In the step shown in FIG. 7A and FIG. 7B, first, a magnetic layer 15P, which is to later become the main pole 15, and a not-shown connection layer are formed by frame plating, for example. The magnetic layer 15P and the connection layer are formed such that their top surfaces are higher in level than the portions of the gap layer 18 lying on the side shields 16C and 16D. Next, although not shown, the nonmagnetic layer 57 is formed over the entire top surface of the stack. The magnetic layer 15P, the connection layer and the nonmagnetic layer 57 are then polished by, for example, CMP, until the side shields 16C and 16D are exposed.

Figure 8A:
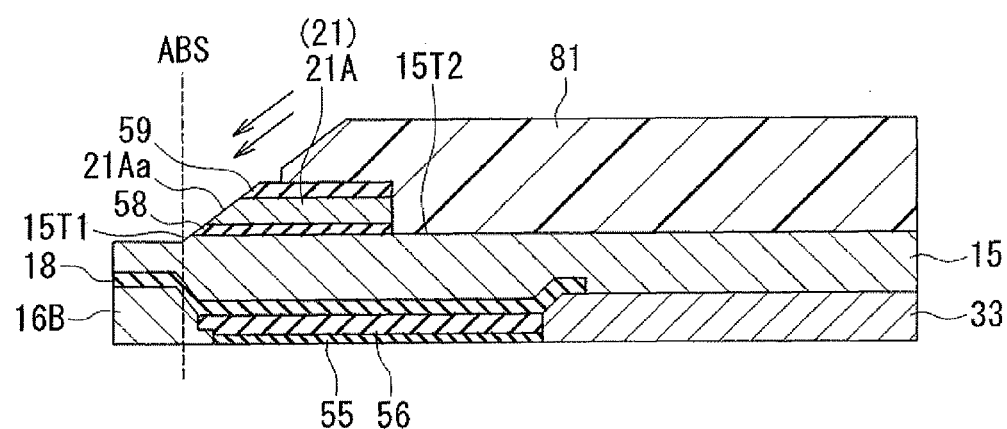
FIG. 8A and FIG. 8B are cross-sectional views showing a step that follows the step shown in FIG. 7A and FIG. 7B.
Figure 8B:
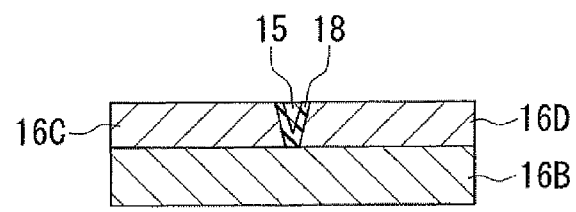

FIG. 8A and FIG. 8B show the next step. In this step, first, the insulating layer 58 is formed over the entire top surface of the stack. The insulating layer 58 is then selectively etched so that part of the top surface of the magnetic layer 15P and the top surface of the connection layer are exposed. Next, the first layer 21 of the first portion 20 of the coil is formed over the insulating layer 58 and the connection layer by frame plating, for example. The insulating layer 59 is then formed on the first layer 21. Next, a photoresist mask 81 is formed over the magnetic layer 15P, the first layer 21 and the insulating layers 58 and 59. Using the photoresist mask 81 as an etching mask, respective portions of the magnetic layer 15P, the side shields 16C and 16D, the gap layer 18, the specific coil element 21A of the first layer 21, and the insulating layers 58 and 59 are then etched by IBE, for example. This makes the magnetic layer 15P into the main pole 15. The photoresist mask 81 is then removed.

Where IBE is employed to etch the portions of the magnetic layer 15P, the side shields 16C and 16D, the gap layer 18, the first layer 21 and the insulating layers 58 and 59, the etching is performed such that ion beams travel in a direction at an angle of 40° to 75° relative to the direction perpendicular to the top surface 1a of the substrate 1 and that the direction of travel of the ion beams is caused to rotate as viewed in the direction perpendicular to the top surface 1a of the substrate 1. The arrows in FIG. 8A indicate the direction of travel of the ion beams. Performing IBE in such a manner provides the magnetic layer 15P with a top surface having the inclined portion 15T1 and the flat portion 15T2. This allows the inclined portion 15T1 of the top surface 15T, the end face of the insulating layer 58, the end face 21Aa of the specific coil element 21A, and the end face of the insulating layer 59 to be located in one plane.

Figure 9A:
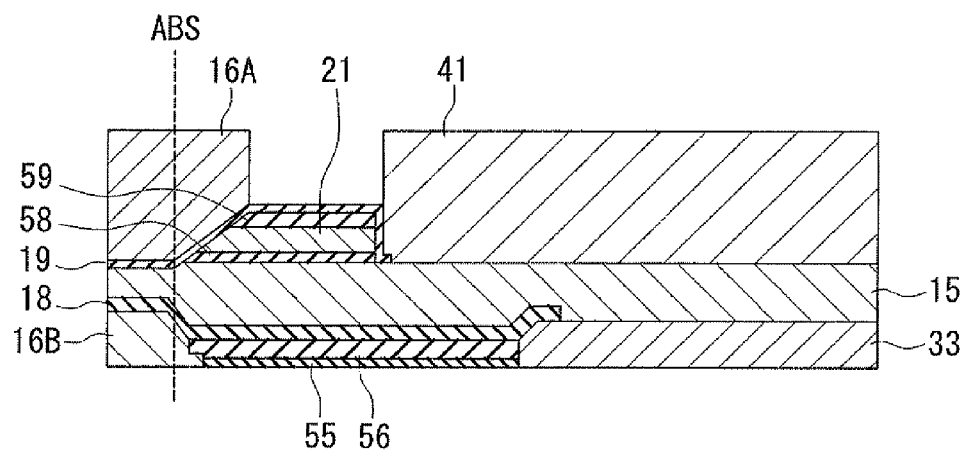
FIG. 9A and FIG. 9B are cross-sectional views showing a step that follows the step shown in FIG. 8A and FIG. 8B.
Figure 9B:
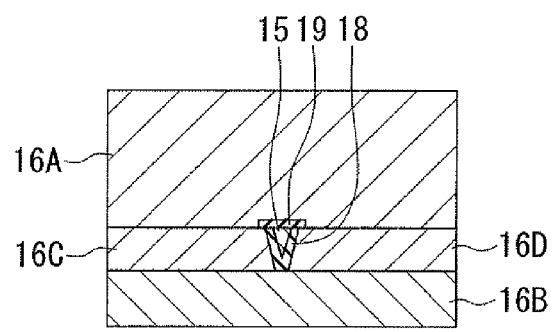

FIG. 9A and FIG. 9B show the next step. In this step, first, the insulating layer 19 is formed over the entire top surface of the stack. The insulating layer 19 is then selectively etched by, for example, IBE, so that part of the top surface 15T of the main pole 15 and part of each of the top surfaces of the side shields 16C and 16D are exposed. The insulating layers 19 and the 59 are also selectively etched by, for example, IBE, so that the coil connection part 21E (see FIG. 5) of the first layer 21 is exposed. Frame plating, for example, is then performed to form the first shield 16A over the side shields 16C and 16D and the insulating layer 19 and form the columnar portion 41 on the main pole 15.

Figure 10A:
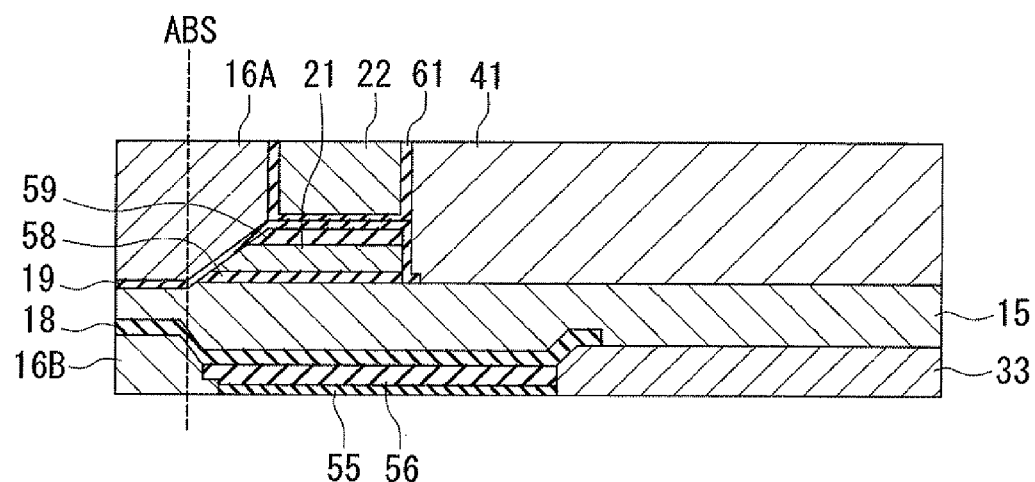
FIG. 10A and FIG. 10B are cross-sectional views showing a step that follows the step shown in FIG. 9A and FIG. 9B.
Figure 10B:
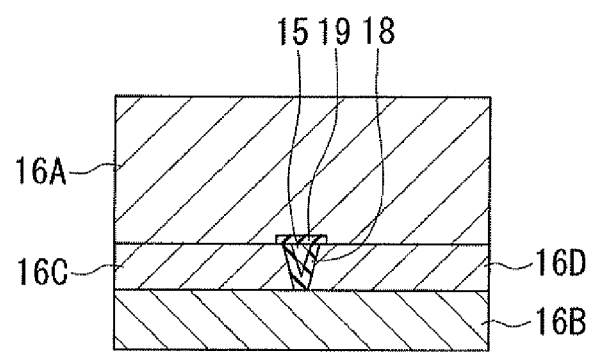

FIG. 10A and FIG. 10B show the next step. In this step, first, the insulating film 61 is formed over the entire top surface of the stack. The insulating film 61 is then selectively etched so that the coil connection part 21E of the first layer 21 is exposed. Then, the second layer 22 of the first portion 20 of the coil is formed by frame plating, for example. The second layer 22 is formed such that its top surface is higher in level than portions of the insulating film 61 lying on the first shield 16A and the columnar portion 41. Next, although not shown, the nonmagnetic layer 62 is formed over the entire top surface of the stack. The first layer 21, the insulating film 61 and the nonmagnetic layer 62 are then polished by, for example, CMP, until the first shield 16A and the columnar portion 41 are exposed.

Steps that follow the step of FIG. 10A and FIG. 10B will now be described with reference to FIG. 2 and FIG. 3. First, the insulating layer 63 is formed over the entire top surface of the stack. The insulating layer 63 is then selectively etched by, for example, IBE, so that the top surfaces of the first shield 16A and the columnar portion 41 are exposed. Next, the magnetic layer 42 is formed over the first shield 16A, the columnar portion 41 and the insulating layer 63 by frame plating, for example.

Next, the protective layer 70 is formed to cover the entire top surface of the stack. Wiring, terminals and other components are then formed on the protective layer 70, and the substrate 1 is cut near the position ABS at which the medium facing surface 80 is to be formed. The cut surface is polished into the medium facing surface 80, and then fabrication of flying rails and other processes are performed to complete the magnetic head.

Second Embodiment

Figure 11:
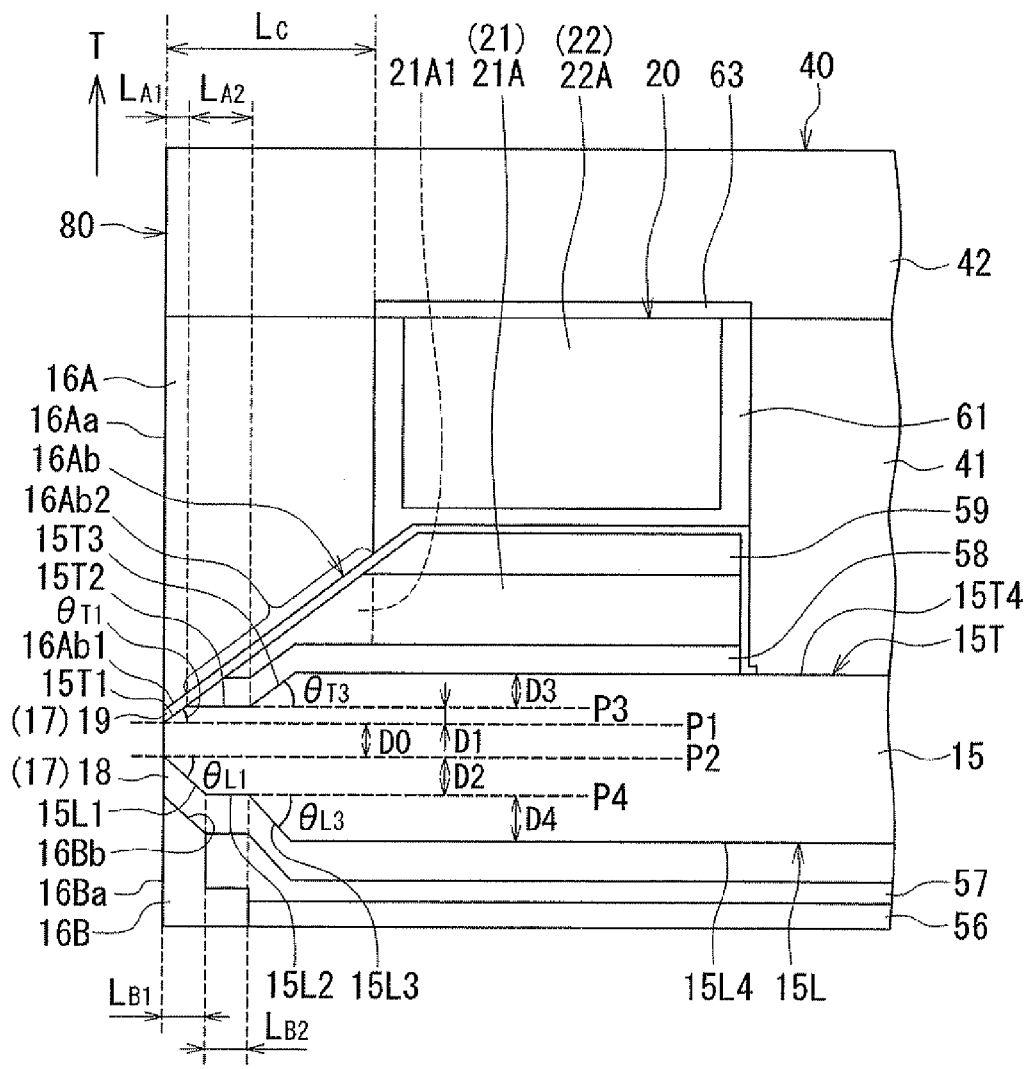
FIG. 11 is a cross-sectional view showing the main part of a magnetic head according to a second embodiment of the invention.

A magnetic head according to a second embodiment of the invention will now be described with reference to FIG. 11. FIG. 11 is a cross-sectional view showing the main part of the magnetic head according to the present embodiment. FIG. 11 shows a cross section perpendicular to the medium facing surface and to the top surface of the substrate, or the main cross section, in particular.

The configuration of the magnetic head according to the present embodiment is different from that of the magnetic head according to the first embodiment in the following respects. The top surface 15T of the main pole 15 of the present embodiment includes a first inclined portion 15T1, a first flat portion 15T2, a second inclined portion 15T3, and a second flat portion 15T4 contiguously arranged in this order, the first inclined portion 15T1 being closest to the medium facing surface 80. The first inclined portion 15T1 has a first end located in the medium facing surface 80 and a second end opposite to the first end. The first flat portion 15T2 is connected to the second end of the first inclined portion 15T1. The second inclined portion 15T3 has a first end connected to the first flat portion 15T2 and a second end that is located farther from the medium facing surface 80 than is the first end. The second flat portion 15T4 is connected to the second end of the second inclined portion 15T3.

The bottom end 15L of the main pole 15 includes a first inclined portion 15L1, a first flat portion 15L2, a second inclined portion 15L3, and a second flat portion 15L4 contiguously arranged in this order, the first inclined portion 15L1 being closest to the medium facing surface 80. The first inclined portion 15L1 has a first end located in the medium facing surface 80 and a second end opposite to the first end. The first flat portion 15L2 is connected to the second end of the first inclined portion 15L1. The second inclined portion 15L3 has a first end connected to the first flat portion 15L2 and a second end that is located farther from the medium facing surface 80 than is the first end. Each of the first inclined portion 15L1, the first flat portion 15L2 and the second inclined portion 15L3 may be an edge formed by two intersecting planes, or may be a plane connecting two planes to each other. The second flat portion 15L4 is a plane connected to the second end of the second inclined portion 15L3.

Here, as shown in FIG. 11, assume a first virtual plane P1 that passes through the first end of the first inclined portion 15T1 of the top surface 15T and is perpendicular to the medium facing surface 80 and to the direction T of travel of the recording medium. The first inclined portion 15T1 is inclined relative to the first virtual plane P1 and the medium facing surface 80 such that the second end of the first inclined portion 15T1 is located on the front side in the direction T of travel of the recording medium relative to the first virtual plane P1. The second inclined portion 15T3 is inclined relative to the first virtual plane P1 and the medium facing surface 80 such that the second end of the second inclined portion 15T3 is located on the front side in the direction T of travel of the recording medium relative to the first end of the second inclined portion 15T3. The first and second flat portions 15T2 and 15T4 extend in a direction substantially perpendicular to the medium facing surface 80.

Assume also a second virtual plane P2 that passes through the first end of the first inclined portion 15L1 of the bottom end 15L and is perpendicular to the medium facing surface 80 and to the direction T of travel of the recording medium. The first inclined portion 15L1 is inclined relative to the second virtual plane P2 and the medium facing surface 80 such that the second end of the first inclined portion 15L1 is located on the rear side in the direction T of travel of the recording medium relative to the second virtual plane P2. The second inclined portion 15L3 is inclined relative to the second virtual plane P2 and the medium facing surface 80 such that the second end of the second inclined portion 15L3 is located on the rear side in the direction T of travel of the recording medium relative to the first end of the second inclined portion 15L3. The first and second flat portions 15L2 and 15L4 extend in a direction substantially perpendicular to the medium facing surface 80.

The first shield 16A of the write shield 16 includes a portion interposed between the second inclined portion 15T3 of the top surface 15T and the medium facing surface 80. The second shield 16B includes a portion interposed between the second inclined portion 15L3 of the bottom end 15L and the medium facing surface 80.

Here, as shown in FIG. 11, the lengths of the first inclined portion 15T1 and the first flat portion 15T2 of the top surface 15T in the direction perpendicular to the medium facing surface 80 will be represented by the symbols $L_{A1}$ and $L_{A2}$, respectively, and the lengths of the first inclined portion 15L1 and the first flat portion 15L2 of the bottom end 15L in the direction perpendicular to the medium facing surface 80 will be represented by the symbols $L_{B1}$ and $L_{B2}$, respectively. The length $L_{A1}$ is smaller than the length $L_C$ of the first inclined surface 16Ab of the first shield 16A in the direction perpendicular to the medium facing surface 80. The length $L_{A1}$ falls within the range of 0.05 to 0.15 μm, for example. The length $L_{A2}$ falls within the range of 0.2 to 0.6 μm, for example. The length $L_{B1}$ falls within the range of 0.1 to 0.5 μm, for example. The length $L_{B2}$ falls within the range of 0.2 to 0.6 μm, for example.

The angle of inclination of the first inclined portion 15T1 of the top surface 15T relative to the first virtual plane P1 will be represented by the symbol $\theta_{T1}$, and the angle of inclination of the first inclined portion 15L1 of the bottom end 15L relative to the second virtual plane P2 will be represented by the symbol $\theta_{L1}$. The angle of inclination $\theta_{T1}$ falls within the range of 24° to 35°, for example. The angle of inclination $\theta_{T1}$ falls within the range of 30° to 50°, for example.

Assume also a virtual plane P3 and a virtual plane P4. The virtual plane P3 passes through the first end of the second inclined portion 15T3 of the top surface 15T and is parallel to the first and second virtual planes P1 and P2. The virtual plane P4 passes through the first end of the second inclined portion 15L3 of the bottom end 15L and is parallel to the first and second virtual planes P1 and P2. The angle of inclination of the second inclined portion 15T3 relative to the virtual plane P3 will be represented by the symbol $\theta_{T3}$, and the angle of inclination of the second inclined portion 15L3 relative to the virtual plane P4 will be represented by the symbol $\theta_{L3}$. The angles of inclination $\theta_{T3}$ and $\theta_{L3}$ both fall within the range of 22° to 60°, for example.

The thickness of the main pole 15 in the medium facing surface 80, i.e., the distance between the first virtual plane P1 and the second virtual plane P2, will be represented by the symbol D0. The distance between the first flat portion 15T2 of the top surface 15T and the first virtual plane P1 will be represented by the symbol D1. The distance between the first flat portion 15L2 of the bottom end 15L and the second virtual plane P2 will be represented by the symbol D2. The distance D0 falls within the range of 0.05 to 0.1 μm, for example. The distance D1 falls within the range of 0.02 to 0.1 μm, for example. The distance D2 falls within the range of 0.1 to 0.5 μm, for example.

The distance between the second flat portion 15T4 of the top surface 15T and the virtual plane P3 will be represented by the symbol D3. The distance between the second flat portion 15L4 of the bottom end 15L and the virtual plane P4 will be represented by the symbol D4. The distance D3 falls within the range of 0.05 to 0.3 μm, for example. The distance D4 falls within the range of 0.1 to 0.5 μm, for example.

In the present embodiment, the top surface 15T of the main pole 15 includes the first and second inclined portions 15T1 and 15T3, while the bottom end 15L of the main pole 15 includes the first and second inclined portions 15L1 and 15L3. This allows the main pole 15 to be small in thickness in the medium facing surface 80 and be large in thickness at a location away from the medium facing surface 80. Furthermore, in the present embodiment, the length $L_{A1}$ of the first inclined portion 15T1 of the top surface 15T in the direction perpendicular to the medium facing surface 80 is smaller than the length $L_C$ of the first inclined surface 16Ab of the first shield 16A in direction perpendicular to the medium facing surface 80. This allows the first inclined portion 15T1 and the first inclined surface 16Ab to be opposed to each other over a smaller area, thereby making it possible to prevent magnetic flux leakage from the main pole 15 to the write shield 16.

Furthermore, in the present embodiment, the top surface 15T of the main pole 15 includes the first flat portion 15T2. This allows the distance between the second inclined portion 15T3 and the first shield 16A to be greater than that in the case without the first flat portion 15T2. Likewise, the bottom end 15L of the main pole 15 includes the first flat portion 15L2. This allows the distance between the second inclined portion 15L3 and the second shield 16B to be greater than that in the case without the first flat portion 15L2. The present embodiment thus makes it possible to prevent degradation in the write characteristics induced by magnetic flux leakage from the main pole 15 to the write shield 16.

According to the present embodiment, the above-described features of the shape of the main pole 15 make it possible to prevent the skew-induced problems and provide improved write characteristics.

The remainder of configuration, function and effects of the present embodiment are similar to those of the first embodiment.

Third Embodiment

Figure 12:
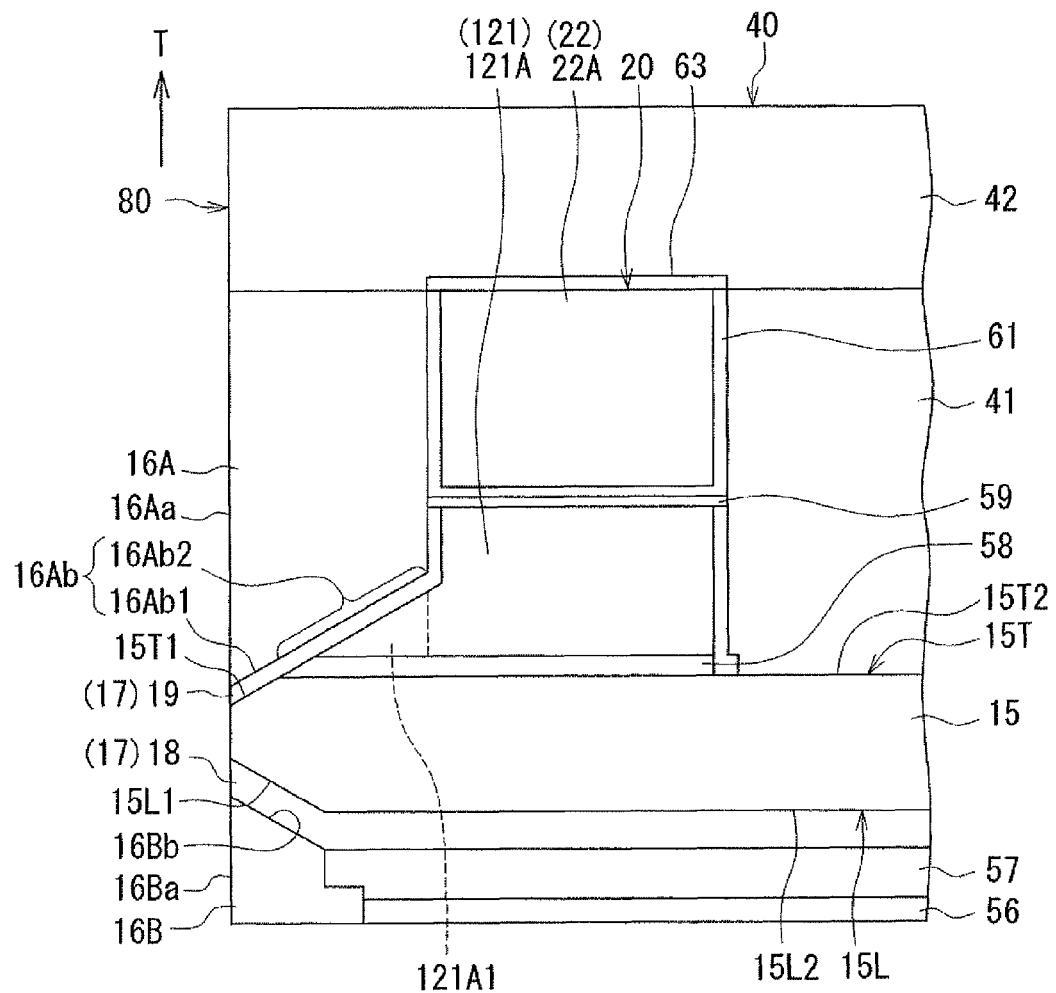
FIG. 12 is a cross-sectional view showing the main part of a magnetic head according to a third embodiment of the invention.

A magnetic head according to a third embodiment of the invention will now be described with reference to FIG. 12. FIG. 12 is a cross-sectional view showing the main part of the magnetic head according to the present embodiment. FIG. 12 shows a cross section perpendicular to the medium facing surface and to the top surface of the substrate, or the main cross section, in particular.

The configuration of the magnetic head according to the present embodiment is different from that of the magnetic head according to the first embodiment in the following respects. The first portion 20 of the coil of the present embodiment includes a first layer 121 in place of the first layer 21 of the first embodiment. The first layer 121 is wound one turn around the columnar portion 41 which constitutes part of the first return path section 40.

In the present embodiment, the insulating layer 19 is not formed above the top surface of the first layer 121. The insulating layer 59 covers the top surfaces of the insulating layer 19 and the first layer 121. The insulating film 61 is interposed between the second layer 22 and each of the first shield 16A, the columnar portion 41 and the insulating layer 59.

As shown in FIG. 12, the first layer 121 includes a first coil element 121A extending to pass between the first shield 16A and the columnar portion 41, in particular, within the first space S1. In the present embodiment, the coil element 121A is the specific coil element. The specific coil element 121A includes a portion 121A1 that is located closer to the medium facing surface 80 than is the fourth end of the first inclined surface 16Ab of the first shield 16A and interposed between the flat portion 15T2 of the top surface 15T and the second portion 16Ab2 of the first inclined surface 16Ab.

The specific coil element 121A has an end face facing toward the medium facing surface 80. The end face of the specific coil element 121A includes a first portion facing toward the first inclined surface 16Ab of the first shield 16A, and a second portion that is contiguous with the first portion and is located farther from the top surface 1a of the substrate 1 than is the first portion. The distance from the medium facing surface 80 to an arbitrary point on the first portion increases with increasing distance from the arbitrary point to the top surface 1a of the substrate 1. The inclined portion 15T1 of the top surface 15T, the end face of the insulating layer 58, and the first portion are located in one plane. The second portion is parallel to the medium facing surface 80.

The first layer 121 has a first coil connection part (not shown) electrically connected to the coil connection part 10E (see FIG. 4) of the second portion 10, and a second coil connection part (not shown) electrically connected to the coil connection part 22S (see FIG. 6) of the second layer 22. The first coil connection part is electrically connected to the coil connection part 10E via the connection layer mentioned in the description of the first embodiment. The coil connection part 22S penetrates the insulating layer 59 and the insulating film 61 and is electrically connected to the second coil connection part.

The main pole 15 of the present embodiment may have the same shape as that in the second embodiment. The remainder of configuration, function and effects of the present embodiment are similar to those of the first or second embodiment.

Fourth Embodiment

Figure 13:
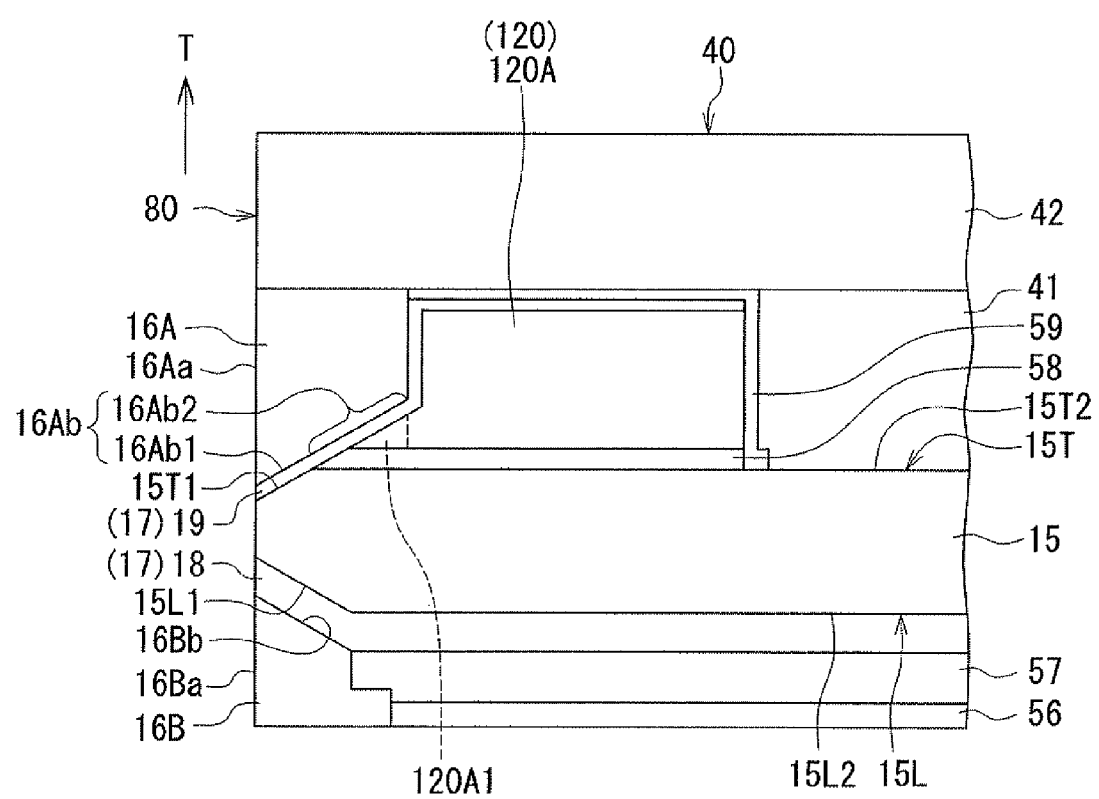
FIG. 13 is a cross-sectional view showing the main part of a magnetic head according to a fourth embodiment of the invention.
Figure 14:
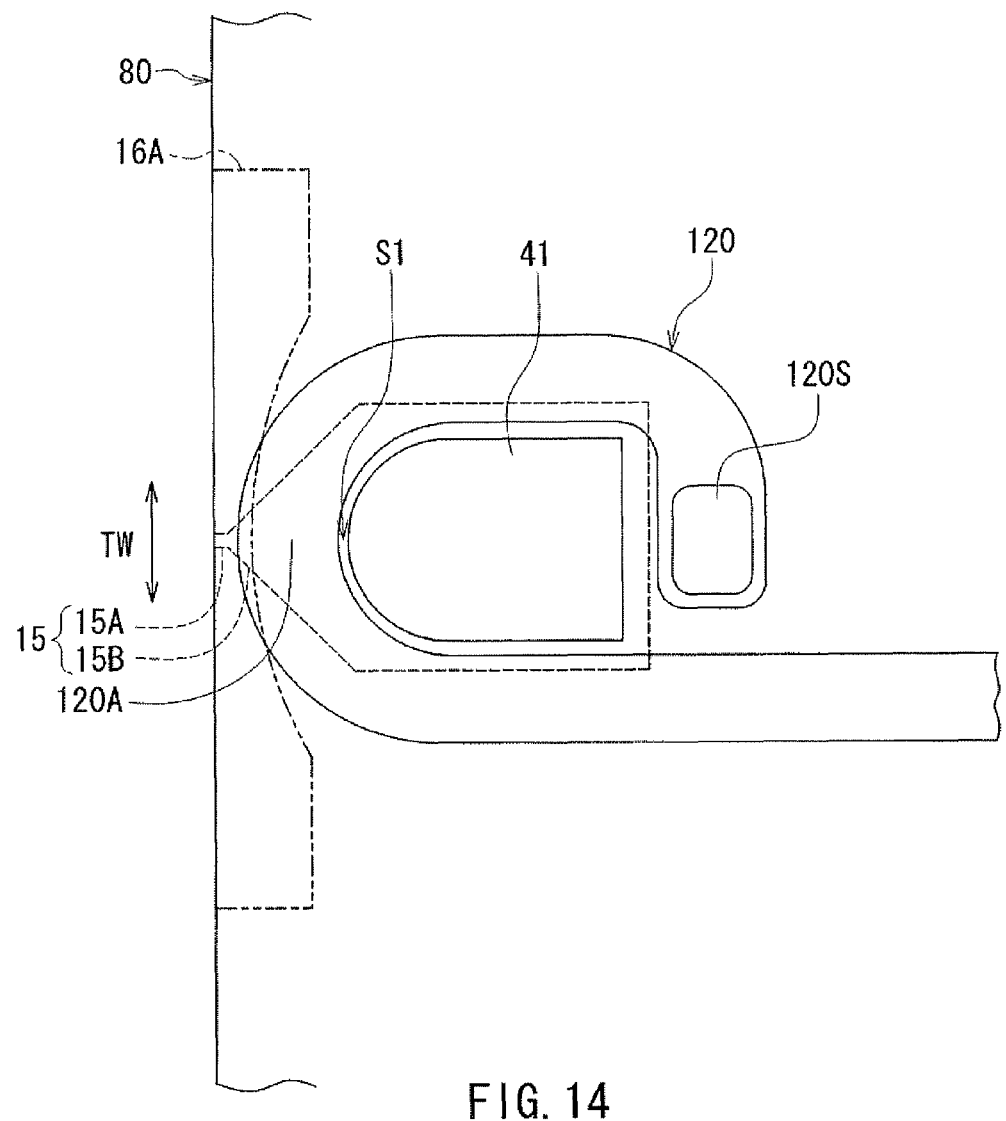
FIG. 14 is a plan view showing a first portion of the coil of the magnetic head according to the fourth embodiment of the invention.

A magnetic head according to a fourth embodiment of the invention will now be described with reference to FIG. 13 and FIG. 14. FIG. 13 is a cross-sectional view showing the main part of the magnetic head according to the present embodiment. FIG. 13 shows a cross section perpendicular to the medium facing surface and to the top surface of the substrate, or the main cross section, in particular. FIG. 14 is a plan view showing a second portion of the coil of the magnetic head according to the present embodiment.

The configuration of the magnetic head according to the present embodiment is different from that of the magnetic head according to the third embodiment in the following respects. The coil of the present embodiment includes a first portion 120 in place of the first portion 20 of the third embodiment. The first portion 120 is located on the insulating layer 58. As shown in FIG. 14, the first portion 120 is wound approximately one turn around the columnar portion 41 which constitutes part of the first return path section 40.

In the present embodiment, the insulating layer 19 covers the top surface of the first layer 121. The insulating layer 59 covers part of the insulating layer 19, the first portion 120, and the insulating layer 58. The magnetic head according to the present embodiment is without the insulating film 61, the nonmagnetic layer 62 and the insulating layer 63.

As shown in FIG. 14, the first portion 120 includes a first coil element 120A extending to pass between the first shield 16A and the columnar portion 41, in particular, within the first space S1. In the present embodiment, the coil element 120A is the specific coil element. The shape and location of the specific coil element 120A are the same as those of the specific coil element 121A of the third embodiment. More specifically, the specific coil element 120A includes a portion 120A1 that is located closer to the medium facing surface 80 than is the fourth end of the first inclined surface 16Ab of the first shield 16A and interposed between the flat portion 15T2 of the top surface 15T and the second portion 16Ab2 of the first inclined surface 16Ab. The first portion 120 has a coil connection part 120S electrically connected to the coil connection part 10E (see FIG. 4) of the second portion 10. The coil connection part 120S is electrically connected to the coil connection part 10E via the connection layer mentioned in the description of the first embodiment.

In the present embodiment, the at least one first coil element is the single coil element 120A. The present embodiment thus allows the length of the magnetic path passing through the write shield 16, the first return path section 40 and the main pole 15 to be smaller than that in the case where the coil includes two or more first coil elements. The remainder of configuration, function and effects of the present embodiment are similar to those of the third embodiment.

The present invention is not limited to the foregoing embodiments, and various modifications may be made thereto. For example, of the first return path section 40 and the second return path section 30, only the first return path section 40 may be provided in the magnetic head.

It is apparent that the present invention can be carried out in various forms and modifications in the light of the foregoing descriptions. Accordingly, within the scope of the following claims and equivalents thereof, the present invention can be carried out in forms other than the foregoing most preferred embodiments.

What is claimed is:

1. A magnetic head for perpendicular magnetic recording for writing data on a recording medium, the magnetic head for perpendicular magnetic recording comprising:
   a medium facing surface that faces the recording medium;
   a coil that produces a magnetic field corresponding to data to be written on the recording medium;
   a main pole that has an end face located in the medium facing surface, the main pole allowing a magnetic flux that corresponds to the magnetic field produced by the coil to pass, and producing a write magnetic field for writing the data on the recording medium by means of a perpendicular magnetic recording system;
   a write shield made of a magnetic material and having an end face located in the medium facing surface;
   a gap part made of a nonmagnetic material and interposed between the main pole and the write shield; and
   a first return path section made of a magnetic material and located on a front side in a direction of travel of the recording medium relative to the main pole, wherein:
   the end face of the write shield includes a first end face portion located on the front side in the direction of travel of the recording medium relative to the end face of the main pole;
   the first return path section connects the write shield and part of the main pole away from the medium facing surface to each other so that a first space is defined by the main pole, the gap part, the write shield, and the first return path section;
   the coil includes at least one first coil element extending to pass through the first space;
   the main pole has a top surface located at an end on the front side in the direction of travel of the recording medium;
   the top surface of the main pole includes an inclined portion and a flat portion arranged in this order, the inclined portion being closer to the medium facing surface than the flat portion;
   the inclined portion has a first end located in the medium facing surface and a second end opposite to the first end;
   assuming a virtual plane that passes through the first end of the inclined portion and is perpendicular to the medium facing surface and to the direction of travel of the recording medium, the inclined portion is inclined relative to the virtual plane and the medium facing surface such that the second end is located on the front side in the direction of travel of the recording medium relative to the virtual plane;
   the flat portion extends in a direction substantially perpendicular to the medium facing surface;
   the write shield has an inclined surface facing toward the top surface of the main pole;
   the inclined surface has a third end located in the medium facing surface and a fourth end opposite to the third end, the inclined surface being inclined relative to the virtual plane and the medium facing surface such that the fourth end is located farther from the virtual plane than is the third end;
   the inclined portion is smaller than the inclined surface in length in a direction perpendicular to the medium facing surface;
   the inclined surface includes: a first portion that is opposed to the inclined portion with the gap part interposed therebetween; and a second portion that is contiguous with the first portion and is located farther from the medium facing surface than is the first portion;

the at least one first coil element includes one specific coil element; and the specific coil element includes a portion that is located closer to the medium facing surface than is the fourth end and interposed between the flat portion and the second portion.

2. The magnetic head for perpendicular magnetic recording according to claim 1, wherein a minimum distance between the specific coil element and the medium facing surface falls within the range of 0.1 to 0.15 µM.

3. The magnetic head for perpendicular magnetic recording according to claim 1, wherein:

the first return path section includes a columnar portion disposed such that the specific coil element is interposed between the columnar portion and the inclined surface; and a minimum distance between the columnar portion and the medium facing surface falls within the range of 0.7 to 1.2 µm.

4. The magnetic head for perpendicular magnetic recording according to claim 1, wherein the specific coil element and the flat portion of the top surface of the main pole are at a distance of 5 to 100 nm from each other.

5. The magnetic head for perpendicular magnetic recording according to claim 1, further comprising an insulating layer disposed between the specific coil element and the flat portion of the top surface of the main pole, wherein:

each of the specific coil element and the insulating layer has an end face facing toward the inclined surface; and the inclined portion, the end face of the insulating layer, and the end face of the specific coil element are located in one plane.

6. The magnetic head for perpendicular magnetic recording according to claim 1, wherein the end face of the write shield includes a second end face portion located on a rear side in the direction of travel of the recording medium relative to the end face of the main pole, the magnetic head further comprising a second return path section made of a magnetic material and located on the rear side in the direction of travel of the recording medium relative to the main pole, wherein:

the second return path section connects the write shield and part of the main pole away from the medium facing surface to each other so that a second space is defined by the main pole, the gap part, the write shield, and the second return path section; and the coil includes at least one second coil element extending to pass through the second space.

7. The magnetic head for perpendicular magnetic recording according to claim 6, wherein the end face of the write shield further includes a third end face portion and a fourth end face portion, the third end face portion and the fourth end face portion being located on opposite sides of the end face of the main pole in a track width direction.

\* \* \* \* \*